(12) United States Patent
Pierson et al.

(10) Patent No.: US 7,272,728 B2
(45) Date of Patent: Sep. 18, 2007

(54) NETWORK SECURITY AND FRAUD DETECTION SYSTEM AND METHOD

(75) Inventors: Greg Pierson, Gresham, OR (US); Jason DeHaan, Chicago, IL (US)

(73) Assignee: Iovation, Inc., Portland, OR (US)

( * ) Notice: Subject to any disclaimer, the term of this patent is extended or adjusted under 35 U.S.C. 154(b) by 543 days.

(21) Appl. No.: 10/867,871

(22) Filed: Jun. 14, 2004

(65) Prior Publication Data

US 2006/0048211 A1 Mar. 2, 2006

(51) Int. Cl.
*G06F 1/24* (2006.01)

(52) U.S. Cl. .................. 713/194; 713/166; 713/167; 713/168

(58) Field of Classification Search ............... 713/166, 713/167, 168, 194
See application file for complete search history.

(56) References Cited

U.S. PATENT DOCUMENTS 5,838,306 A   11/1998   O'Connor et al.

*Primary Examiner*—Thomas R. Peeso
(74) *Attorney, Agent, or Firm*—Schwabe, Williamson & Wyatt

(57) ABSTRACT

A system and method to detect and prevent fraud in a system is provided. The system may uniquely identify physical devices connecting to a network, register unique devices, track end-user logins, associate end-user accounts with specific devices, and share information with multiple network service providers is described.

56 Claims, 14 Drawing Sheets

FIGURE 8B

SNARE_AFFIL_TOKEN - An Affiliate may have one or more Tokens (SNAR

- SNARE_AFFIL_TOKEN_ID
- SNARE_AFFILIATE_CODE
- SNARE_TOKEN_ID
- SNARE_TOKEN_STATUS_CODE
- SNARE_AFFIL_TOKEN_DEL_FLG
- CREATED_DATE
- CREATED_BY
- MODIFIED_DATE
- MODIFIED_BY

- SNARE_AFFIL_TOKEN_BIR_TRG - SAFT_BIR_TRG
- SNARE_AFFIL_TOKEN_BUR_TRG - SAFT_BUR_TRG
- SNARE_AFFIL_TOKEN_AUR_TRG - SAT_AUR_TRG
- SNARE_TKN_STS_2_AFF_TKN_FK_IDX
- SNARE_TKN_2_AFFIL_TKN_FK_IDX
- SNARE_AFFIL_TOKEN_UK_IDX
- SNARE_AFFIL_2_AFFIL_TKN_FK_IDX
- SNARE_AFFIL_TOKEN_PK
- SNARE_AFFIL_TOKEN_UK
- SNARE_TKN_2_AFFIL_TKN_FK
- SNARE_TKN_STS_2_AFFIL_TKN_FK
- SNARE_AFFIL_2_AFFIL_TKN_FK

150

SNARE_SOAPD_AUDIT - Debug Table for SOAPD

- SNARE_SOAPD_AUDIT_ID
- SNARE_AFFILIATE_CODE
- SNARE_SOAPD_AUDIT_LOCAL_IP
- SNARE_SOAPD_AUDIT_LOCAL_PORT
- SNARE_SOAPD_AUDIT_AFFIL_GWIP
- SNARE_SOAPD_AUDIT_AFFIL_PORT
- SNARE_SOAPD_AUDIT_SOAPD_PID
- SNARE_SOAPD_AUDIT_STATE
- SNARE_SOAPD_AUDIT_RETIRED
- SNARE_SOAPD_AUDIT_MSG_RECD_CNT
- SNARE_SOAPD_AUDIT_MSG_SENT_CNT
- SNARE_SOAPD_AUDIT_IPC_RECD_CNT
- SNARE_SOAPD_AUDIT_IPC_SENT_CNT
- CREATED_DATE
- CREATED_BY
- MODIFIED_DATE
- MODIFIED_BY

- SNARE_SOAPD_AUD_BIR_TRG - SSA_BIR_TRG
- SNARE_SOAPD_AUDIT_BUR_TRG - SSA_BUR_TRG
- SNARE_AFF_2_SOAPD_AUDIT_FK_IDX
- SNARE_SOAPD_AUDIT_PK
- SNARE_AFF_2_SOAPD_AUDIT_FK

145

SNARE_USER - Distinct Customers In Sn

- SNARE_USER_ID
- SNARE_USER_CUSTOMER_ID
- SNARE_AFFILIATE_CODE
- SNARE_USER_TEST_FLG
- CREATED_DATE
- CREATED_BY
- MODIFIED_DATE
- MODIFIED_BY

- SNARE_USER_BUR_TRG - SU_BUR_TRG
- SNARE_USER_BIR_TRG - SU_BIR_TRG
- SNARE_USER_UK_IDX
- SNARE_AFFIL_2_SNARE_USR_FK_IDX
- SNARE_USER_PK
- SNARE_USER_UK
- SNARE_USER_TEST_FLG_CHK
- SNARE_AFFIL_2_SNARE_USR_FK

SNARE_TOKEN_NUID - Captured Values for Captured Tokens — 149

- SNARE_TOKEN_NUID_ID
- SNARE_TOKEN_NUID_EUGWIP
- SNARE_TOKEN_NUID_EUIP
- SNARE_TOKEN_NUID_WPID
- SNARE_TOKEN_NUID_WMPL
- SNARE_TOKEN_NUID_WIND
- SNARE_TOKEN_NUID_IEID
- SNARE_TOKEN_NUID_ROWN
- SNARE_TOKEN_NUID_RORG
- SNARE_TOKEN_NUID_HDID
- SNARE_TOKEN_NUID_WKEY
- CREATED_DATE
- CREATED_BY
- MODIFIED_DATE
- MODIFIED_BY

SNARE_TOKEN_NUID_BIR_TRG - STN_BIR_TRG
SNARE_TOKEN_NUID_AUR_TRG - STN_AUR_TRG
SNARE_TOKEN_NUID_BUR_TRG - STN_BUR_TRG
SNARE_TOKEN_NUID_COLS_IDX
SNARE_TOKEN_NUID_PK

SNARE_TOKEN_ACTIVITY - Events Pertaining to Tokens — 147

- SNARE_TOKEN_ACTIVITY_ID
- SNARE_TOKEN_ID
- SNARE_ACTIVITY_TYPE_ID
- SNARE_TOKEN_ACTIVITY_TIME
- CREATED_DATE
- CREATED_BY
- MODIFIED_DATE
- MODIFIED_BY

SNARE_TOKEN_ACT_BUR_TRG - STA_BUR_TRG
SNARE_TOKEN_ACT_BIR_TRG - STA_BIR_TRG
SNARE_TKN_ACT_COLS_UK_IDX
SNARE_TOKEN_ACTIVITY_PK
SNARE_TKN_ACT_COLS_UK
SNARE_TKN_2_TKN_ACT_FK
SNARE_ACT_TYP_2_TKN_ACT_FK

SNARE_AFFILIATE - Distinct Affiliate — 144

- SNARE_AFFILIATE_CODE
- SNARE_AFFILIATE_NAME
- SNARE_AFFILIATE_DESC
- CREATED_DATE
- CREATED_BY
- MODIFIED_DATE
- MODIFIED_BY

SNARE_AFFILIATE_BUR_TRG - SA_BUR_TRG
SNARE_AFFILIATE_PK

FIGURE 8D

NETWORK SECURITY AND FRAUD DETECTION SYSTEM AND METHOD

FIELD OF THE INVENTION

The present invention relates generally to the field of network security, including detection and prevention of fraudulent transaction and identity theft. By sharing information about associations between end-users and specific network devices, the present invention has other potential uses that include, but are not limited to, content distribution, hardware authentication, protection against piracy of software and other electronic media, monitoring customer behavior, target marketing, and customer relationship management.

BACKGROUND OF THE INVENTION

The continued growth of telecommunications infrastructure and proliferation of network devices, service providers, wireless technology and related software products have transformed the Internet into a tool for everyday use. Businesses are increasingly using the Internet as a method of communicating with customers, vendors, employees and shareholders and conducting business transactions. In theory, conducting business on the Internet is often efficient and cost effective, particularly when products and services can be distributed electronically. In practice, damage caused by hackers, identity theft, stolen credit cards, and other fraudulent activities can be enormously expensive and difficult to manage. At a minimum, these realities significantly increase the risks and costs associated with conducting business over the Internet specifically, and generally over any type of network.

While a number of methods are commonly used to make it safer to use the Internet and facilitate communication and business transactions, they all have inherent and exploitable weaknesses. Login names and passwords are one of the most widely used and accepted forms of basic network security, where access is limited to an exact match of a login and password combination. The identification of valid login names is often trivial, particularly on networks where logins are visible to observers and in organizations where users have a common login format, such as "firstinitial_lastname". Since end-users often use common, simple and default passwords, share passwords, and write down more complicated passwords, passwords can be guessed, requested, or observed. Thus, the user name and password combination provides only a basic level of security and should not be relied upon exclusively, particularly to guard networks accessible via the Internet.

A secondary user authentication system goes a step beyond reliance on just user name and password and can greatly increase security. The secondary authentication relies on something the user has in their possession, such as a special purpose hardware device. For example, after entering a valid user name and password to access a network, a user may be given a code as part of the login process. The user enters the code into a device within a specified amount of time, and the device provides a secondary code/password for the user to enter as part of the login process. While significantly more secure, these systems are not perfect. More importantly, these systems can be impractical in protecting large networks accessible by the general public, and create significant barriers to entry.

A hardware key, sometimes referred to as a "dongle" that might be connected to a computer by a USB port, is sometimes used to identify end-users connecting from a particular device. A fixed system component serial number and other hardware methods used to uniquely identify a specific network devices are also used to limit access to 'known' devices. Unfortunately, these methods can be copied and simulated in software. These systems also create barriers and can be impractical in protecting large networks accessible by the general public.

The use of digital certificates and Trusted Third Party Certificate Authorities are increasingly popular methods of ensuring that the party connecting to a network is indeed who they claim to be. Unfortunately, certificates can be copied and even stolen remotely. Moreover, significant trust must be placed in third party verification groups that do not have a direct vested interest in the networks relying upon them. The requirement for network users to utilize certificates can also create a significant barrier, particularly for large networks accessible by the general public, and create significant barriers to entry.

An Internet Protocol (IP) address and geo-location services relying upon IP address are sometimes used to verify end-users or at least to cross reference likely physical location with known information about a user. These methods are limited by the fact that many Internet users obtain a new temporary IP address every time they connect to the Internet. Moreover, using IP addresses to pinpoint the actual location of a connected device is inherently flawed by the nature in which blocks of IP numbers are distributed and the relative ease of IP spoofing, a technique used by network intruders to make it appear that they are connecting from a trusted or different IP address.

The negative credit card databases and lists of identities used in fraudulent activities are reasonable screening tools and should be used to the extent that they are cost effective. However, such lists can never be relied upon exclusively because it is practically impossible for such lists to be up-to date and comprehensive. In addition, these lists offer absolutely no protection against so-called 'friendly charge backs', declined payments by credit card holders that make purchases using their own valid credit card who later claim that they did not make the purchase.

Screening services, such as RiskGardian provided by TrustMarque, and other risk assessment services are also reasonable screening tools and should be used to the extent that they are cost effective. These services utilize little concrete information about a specific user or device and only assign relative risks associated to a particular transaction based upon general information and trends. Finally, such services rely exclusively on historical trends and are poor at identifying new problems and emerging risk areas.

Fingerprints, voice recognition, retinal scans, face recognition, DNA, and other biometric identification methods will become increasingly more common. At this time, these methods of user identification are substantially cost prohibitive. Moreover, one or more of these methods must be widely distributed and generally accepted by end-users for consideration and use by most organizations conducting business over the Internet. Even if such a method was available and cost effective, once unique biometric identifiers are converted into electronic information, they too can be stolen, copied and otherwise compromised.

While all of these methods and others have their weaknesses and can be exploited, each has a place in network security. The types of access, level of security, nature of user populations, and other factors will dictate which group of methods will best serve each application. The present invention is not intended to replace any of these means of protecting networks and screening out unauthorized users. Organizations should use any and all cost effective means at their disposal to screen network access. The present invention enhances security by providing capabilities undeliverable by any other of the above typical systems and methods. Thus, it is desirable to provide a network security and fraud detection system and method and it is to this end that the present invention is directed.

SUMMARY OF THE INVENTION

These and other objects are achieved by a system that uniquely identifies network devices connecting to a network, and correlates logins with each network device used. This information can be used to observe login behavior, such as accounts connecting from 'too many' devices, or 'too many' accounts connecting from the same device. In addition, this information can be used to cross-reference physical devices used by known fraudulent accounts, and cross-reference other accounts used by specific devices. Physical devices involved in suspicious or fraudulent activity, or devices associated with accounts involved in suspicious activity can be prevented from connecting to a network. Finally, this information can be shared with other networks utilizing the system. In this way, physical devices associated with suspicious or fraudulent activity on one network could be denied access to other networks, based on the business rules and risk tolerance parameters of each individual network.

The system is an advanced fraud detection and prevention tool that can significantly reduce the risk of Internet transaction and identity fraud since the system allows a business to avoid "problem customers" identified by other participating businesses before they start creating problems for that business, and it eases the process of identifying potential repeat offenders before they create more problems. To accomplish this goal, the system uniquely identifies end-customers as well as their association with one another. The system tracks end-customers behavior over time, identifies 'suspicious' behavior based on parameters established by network service providers, and maintains status for device and end-user associations. This information is shared by all participating businesses so that a business can make the most educated decisions about new and existing customers based on the network devices they use and the history of those devices with other businesses. In a preferred embodiment, the fraud detection and prevention system is comprised of three major real-time components including a server, a client and a set of application programming interfaces (APIs). The server contains a centralized database of fraud history that is maintained. The client is a small executable program (having a plurality of lines of code) that 'registers' a network device with the server. The client may be contained within a program distributed by a network service provider that must be used to connect to the network. The client may also be delivered through a stand-alone application, imbedded within a common software product like a web browser, or even imbedded in hardware or memory, any of which would be required to be running when a connection to a network is authenticated by a network service provider protected by this system. The client could also be delivered on demand, through a JavaScript, ActiveX control, or similar technology as a user connects to a network service provider through their favorite web browser. For example, a gambling site might have a new user download a software application that generates a poker table user interface and logic and the client of the fraud detection and prevention system is part of that downloaded software application. The API ("ieSnAPI" in a preferred embodiment) is a set of tools that a back-end system of a network service provider (that uses the fraud detection and prevention system) uses to communicate with the system. In addition to the three real-time components, the system further comprises two administrative components including Web Admin Pages and a reports module. The Web Admin Pages may permit a user of the system to tune its fraud tolerance levels, inspect and change individual customers' fraud status, and check customers' relationships to one another. The reports will keep a business apprised of existing customers who have new fraud activity as well as the usage of the system.

Thus, in accordance with the invention, a network security and fraud detection and prevention system is provided. The system has one or more network service providers that provides a service and a network device that connects to at least one of the network service providers over a communications network to use the provided service. At least one of the network service providers has a fraud detector that comprises a client that is downloaded to the network device when the network device connects to the network service provider wherein the client gathers information about the network device to generate a fingerprint that identifies the network device. The fraud detector also has a database and a module that receives the fingerprint, stores the fingerprint in the database and associates the fingerprint with user information. In accordance with the invention, the fingerprint and user information is shared between the one or more network service providers to detect fraud using the network device across the network service providers.

In accordance with another aspect of the invention, a method for detecting fraud during a connection of a network device to a network service provider using the fraud detection information from a plurality of associated network service providers is provided. Using the method, a network device identifier assigned to the network device is validated and the combination of the network device identifier and a network device fingerprint for the network device are validated. Further, the status of the network device identifier and the network device fingerprint for the network device are verified as acceptable to the network service provider based on the status rules of the network service provider. Then, the status of the network device identifier and the network device fingerprint for the network device is verified as acceptable to the associated network service providers.

In accordance with yet another aspect of the invention, a method for detecting fraud during a connection of an unknown network device to a network service provider is provided. Using the method, an application on a network device is launched which is turn launches a fraud detection client on the network device. The client then determines that the network device is an unregistered network device and receives a network device identifier requested from a fraud detection system. The client then generates a fingerprint based on characteristics of the network device that is forwarded to the fraud detection system. The fraud detection system then verifies that the fingerprint of the network device is not duplicative and then provides a login dialog to the network device if the fingerprint is not duplicative.

A method for detecting fraud during a connection of a known network device to a network service provider is provided. Initially, an application is launched on a network device that launches a fraud detection client on the network device. The client determines that the network device is a registered network device having an assigned network device identifier and the client then generates a fingerprint based on characteristics of the network device that is forwarded to the fraud detection system with the assigned network device identifier. The fraud detection system then verifies that the fingerprint of the network device is not duplicative and that the network device identifier is valid and a login dialog is provided to the network device.

Further, a network security and fraud detection and prevention system is provided that comprises one or more network service providers that provides a service and a network device that connects to at least one of the network service providers over a communications network to use the provided service. At least one network service provider further comprises a fraud detector means that has a client means, downloaded to the network device when the network device connects to the network service provider, for gathering information about the network device to generate a fingerprint that identifies the network device. The fraud detection means also has a database and means for receiving the fingerprint, storing the fingerprint in the database and associating the fingerprint with user information and wherein the fingerprint and user information is shared between the one or more network service providers to detect fraud using the network device across the network service providers.

BRIEF DESCRIPTION OF THE DRAWINGS

FIGS. 8B-8E are diagrams illustrating further details of the database tables shown in FIG. 8A;

DETAILED DESCRIPTION OF A PREFERRED EMBODIMENT

The invention is particularly applicable to an electronic transaction fraud detection system and method and it is in this context that the invention will be described. It will be appreciated, however, that the system and method in accordance with the invention has greater utility, such as to any type of transaction in which it may be desirable to detect fraud being carried out by one or more network devices and user accounts over a communications network, or even detecting and preventing potential fraud or identity theft by individuals trying to complete a transaction remotely by phone or mail, or even in person. An important aspect of this system and method is to associate two pieces of information about a transaction, monitor these associations for all customers, and share status information about these associations with other businesses. Illustrated below is the use of this system to correlate a physical device and a user. In accordance with the invention, the associating of any combination of customer identifier, phone number, drivers license number, social security number, mailing address, ship to address, credit card number, email address, network device, retail purchase location, and any other information captured as part of a purchase could be used to identify and minimize transaction fraud and identity theft. One of the most important aspects of the invention is creating associations, tracking behavior over time, and sharing information with multiple networks or businesses that stand to benefit from sharing this type of information. In this way, fraudulent activity can be identified and stopped within one network/business and prevented in others that share information through this fraud prevention system. For purposes of illustration, a specific example of the fraud detection system in the context of an on-line gambling web site will be described. In accordance with the invention, the system in accordance with the invention may utilize 1) both a network device identifier (NDI) and a network device fingerprint (NDF) to identify a network device; 2) only an NDI to identify a network device; 3) only an NDF to identify a network device; or 4) any other data that may be used to uniquely identify a network device. The information used to identify a network device may be known as a device identifier. In some situations, it may be impossible to extract data from a network device so that only the NDI is used to identify the network device. In other situations, the other data that is used to identify the network device may be a phone number of a caller to a phone ordering system or an identifier for a cellular phone. In the example described below, an NDI and an NDF are used together to identify a network device.

Figure 1:
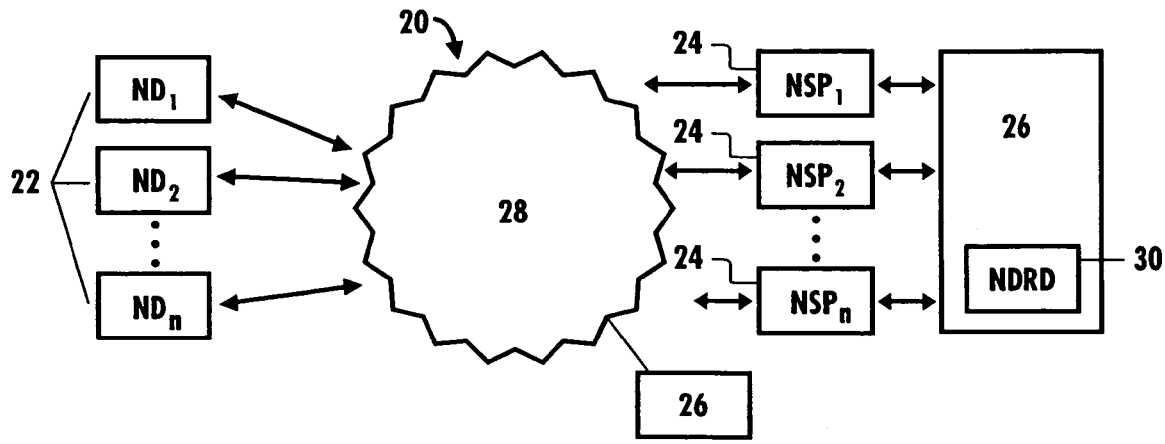
FIG. 1 is a diagram illustrating a computer-implemented electronic transaction network having one or more network devices being connected to one or more network service providers that share fraud information with a fraud detection server that is part of the fraud detection system in accordance with the invention.

FIG. 1 is a diagram illustrating a computer-implemented electronic transaction network 20 having one or more network devices (ND1, . . . , NDn) 22 being connected to one or more network service providers (NSP1, . . . , NSPn) 24, also referred to as hosts, that share fraud information with a fraud detection server 26 that is part of the fraud detection system in accordance with the invention. As shown in FIG. 1, the fraud detection server 26 may be interconnected to the network service providers over a private network or may be interconnected to the network service providers over a communications network 28, such as the Internet or World Wide Web or any other network that is capable of communicating digital data, such as a wireless or cellular network. If the fraud detection server 26 is connected to the communications network 28, then the data between the network service providers 24 and the fraud detection server 26 may be encrypted or travel over a virtual private network to ensure privacy and security. As shown in FIG. 1, each network device may connect to any network service provider 24 over the communications network 28 using well known data protocols such as HTTP, HTTPS and the like. In the system shown in FIG. 1, each network service provider may be providing a service to each network device connected to it and may perform an electronic transaction with each network device, such as a bet in gambling game or a purchase of a product. In accordance with the invention, each electronic transaction is susceptible to fraud and each network device and its user must be uniquely identified to reduce the risk of fraud. Thus, the fraud detection server 26 may receive unique user identification information from each network service provider as well as generate a unique network device identifier that uniquely identifies each network device. Using the unique user identification information and unique network device fingerprint in accordance with the invention, the fraud detection server 26 is able to detect fraudulent activities across the electronic transaction network 20. In particular, the fraud server 26 may provide a centralized service utilizing this invention to uniquely identify physical devices, register unique devices, track end-user logins, associate an end-user account with one or more specific devices, associate a device with one or more end-user accounts, and share this information with each network service provider. The fraud server 26 may include a centralized Network Device Registration Database (NDRD) 30. More details of the fraud server and the fraud detection system in accordance with the invention will be described below with reference to FIGS. 4-7.

The network device 22, for example, may be a personal computer, server computer, laptop computer, personal digital assistant (PDA) such as a Palm-based device or Windows CE device, a cellular phone, a wireless device such as a wireless email device or other device capable of communicating wirelessly with a computer network or any other computing resource that has the processor, memory and input/output capabilities to be able to communicate with a computer network and handle electronic transactions. The network device may also be a telephone of a user used, for example, to order items from a mail order catalog. In operation, a network device, such as ND1, may request access to the electronic transaction network 20 and a particular network service provider, such as NSP1 in this example. To gain access to the NSP, complete a transaction, or access a particular part of the network, a user must log in through a network device. The NSP may then pass an end-user account identifier (EAI) onto the fraud server 26. A client program on the network device may generate a network device fingerprint (NDF) for the network device (unless a fingerprint has already been assigned to that network device) and sends that NDF to the fraud server. The fraud server stores the EAI and NDF in the NDRD 30. Based on the EAI and NDF, as described below in more detail, the likelihood of fraud being committed by the particular end-user with the network device ND1 is determined and an appropriate action is taken. Assuming the network device ND1 is granted access to the network 20, the network device performs its electronic transaction. If a fraudulent activity occurs during that electronic transaction, that information is also stored in the NDRD 30. In this manner, the one or more network service providers 24 share fraud information between each other selectively (as described below in more detail) so that a fraud committed against one network service provider is logged into and tracked by the fraud detection system in accordance with the invention. Thus, a user or network device that has committed fraudulent activities is tracked even when the user or network device logs into a different network service provider. Therefore, the fraudulent activities of a user or network device are tracked across the electronic transaction system 20. Now, each network device will be described in more detail.

Figure 2:
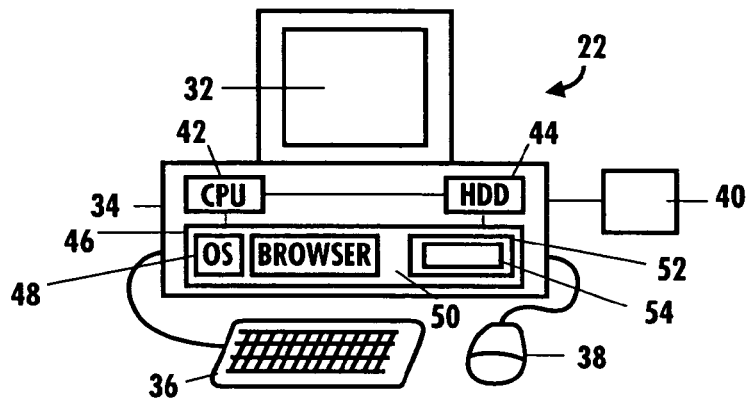
FIG. 2 is a diagram illustrating an example of a network device in accordance with the invention.

FIG. 2 is a diagram illustrating an example of a network device 22 in accordance with the invention. In this example, the network device is a personal computer. In this example, the network device has a display device 32, such as cathode ray tube or liquid crystal display, for displaying information and (optionally images) to the user of the network device, a chassis 34 and one or more input/output devices to permit the user to communicate with the network device and to permit the network device to communicate with the outside world, such as a keyboard 36, a mouse 38 and a device 40 for connecting to and communications with a communications network, such as a network interface card, cable modem, a DSL modem, wireless modem, telephone line modem, etc. . . . The network device 22 further comprises one or more processors 42, a persistent storage device 44, such as a optical tape drive, optical drive, a hard disk drive, flash memory etc. that stores data even when the computer system is powered down and a memory 46, such as SRAM, DRAM, SDRAM, etc. that temporarily store data being executed by the processor and which typically lose data when the computer system is powered down. Typically, when the processor is executing the instructions of a computer program or processing data based on those instructions, the instructions and data are loaded into the memory 46. Thus, when the network device is communicating with the electronic transaction system 20, the memory may store a operating system (OS) 48, a browser application 50 and a downloaded software package 52 wherein each of these are software program having a plurality of lines of instructions that cause the network device to perform a particular function. For example, the operating system 48, such as Windows 2000, may operate to display a graphical user interface to the user and permit the user to execute other computer programs, such as the browser application 50 and one or more downloaded software packages 52. The browser application, such as Netscape Navigator or Microsoft Internet Explorer, when executed by the processor, permits the user to access the World Wide Web as is well known. In this example, the network device 22 may connect to the network service providers (also known as hosts) using the downloadable application 52 distributed by each Host. For example, to connect to Host 1, users must login through Client Software Package 1 and to connect to Host 2, users must login through Client Software Package 2, etc. In accordance with the invention, each downloaded software package may include a small client program 54 that executes on the network device and, among other things, performs some fraud preventing and detection functions and generates the network device fingerprint in accordance with the invention as described below.

In accordance with the invention, embedded in each Client Software Package is a small piece of software that performs a portion of a common Network Device Registration Method (NDRM) that is described in more detail below with reference to FIG. 7. In the example shown in FIG. 1, each Host represents a different private network environment operated by independent organizations that do not share end-user identities. Also in this example, the centralized NDRD 30 used by each Host is remotely located at the fraud server 26 and is a service provided by a third party. Those skilled in the art will appreciate that the NDRM may be implemented in various different manners that are within the scope of this invention. For example, the NDRM may be distributed across a plurality of computing devices (with no central fraud server 26 and no central NDRD) wherein the computing devices, such as a combination of the network devices and network service providers, each perform part of the functions of the fraud detection and preventing system in accordance with the invention. Alternatively, the NDRM may be embedded in a custom application, embedded in the browser application or other common application(s) or in firmware. Furthermore, the NDRM may be a stand alone application or executed remotely and all of these examples of the NDRM are within the scope of the invention. Furthermore, the NDRM may be executed before, after and/or during connection to a network or at periodic intervals, with all combinations of which are within the scope of the invention.

The NDRM in accordance with the invention may be customized for different network device types. For example, with a personal computer that connects to a NSP, the NDRM may use the NDI and NDF to identify the network device. With a cellular phone, it is typically possible to extract data from the cellular phone, such as its serial number, so that an NDF only may be used to identify the cellular phone network device. For a personal digital assistant (PDA) network device, it is typically possible to put data/information onto the PDA only so that the NDI only may be used to identify the PDA. As another example, a PC using Linux would require a different client than a Windows-based PC. In accordance with the invention, the NDRM may also be practiced in a situation in which a hardware device, such as a smart card or PCMCIA card, with a pre-loaded fraud client module on the card may be used in which the card has its own unique identifier that may be used to uniquely identify the card. Thus, the NDRM in accordance with the invention may be implemented in a variety of different manners. Now, more details of an exemplary network service provider (NSP) will be described.

Figure 3:
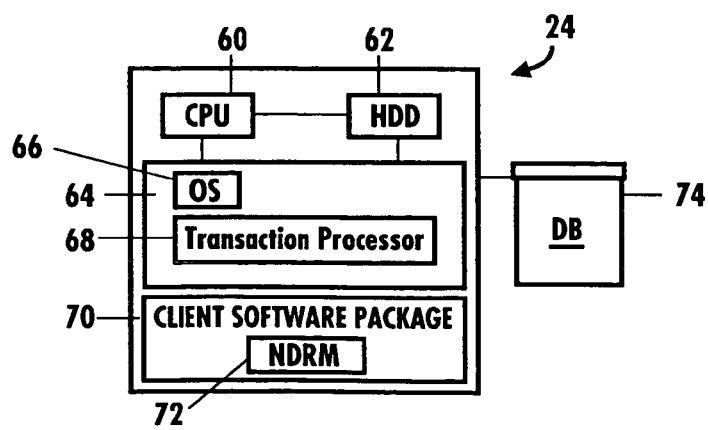
FIG. 3 is a diagram illustrating an example of a network service provider in accordance with the invention.

FIG. 3 is a diagram illustrating an example of a network service provider 24 in accordance with the invention. In this example, the network service provider may a one or more web-based server computer(s), such as a web server, an application server, a database server, etc., that are capable of communicating with a network device over a communications network, such as the Internet or a wireless network and is capable of downloading web pages or a software application to the network device. The network service provider 24 in this example comprises one or more processors 60, one or more persistent storage devices 62 such as those described above and a memory 64 such as described above. For the network service provider 24 to provide the services to the network devices, the memory may store (and the processor(s) may execute) a server operating system 64 and a transaction processing software system 68 to facilitate an electronic transaction between the network service provider 24 and one or more network devices. For example, the transaction processor may process bets at a gambling site or purchases at an e-commerce site. The network service provider 24 may further comprise a client software package 70 that is stored on the network service provider and then downloaded to each network device that desires to conduct a transaction with the particular network service provider. For example, the client software package may be a virtual poker table game, a virtual blackjack game, a virtual slot machine, an e-commerce user interface, etc. . . . In accordance with the invention, each client software package may include a client fraud detection module 72 (that may preferable be a plurality of lines of code and data) that is executed by each network device to implement the fraud detection and prevention system in this example. Each network service provider 24 may further comprise a database 74, such as a database server or a data structure stored in the memory of the network service provider, that stores the well known electronic transaction data for the network service provider. In one embodiment used as an example, the system utilizes an embedded fraud detection client 72. In one implementation of the system, the client is embedded into a proprietary software application for example so that the client may be contained within a program distributed by a network service provider that must be used to connect to the network. In another embodiment, the client may also be delivered through a stand-alone application, imbedded within a common software product like a web browser, or even imbedded in hardware or memory, any of which would be required to be running when a connection to a network is authenticated by a network service provider protected by this system. In another embodiment, the client could also be delivered on demand, through a JavaScript, ActiveX control, or similar technology as a user connects to a network service provider through their favorite web browser. In accordance with the invention, the system may be implemented without any client on the network device. For example, for a phone order or mail order system, the system may establish a unique identifier of the user based on a phone number in which the mail order operator may call the user back to verify that phone number and then use that phone number as the unique identifier for the user. In this case, an NDF (the phone number) is used by the system. Then, in accordance with the invention, the phone number may be stored in the database and then used as described below.

Thus, in accordance with the invention, the client 72, for the device on which it is installed, determines the status of the device (as already having a unique identifier or not) and controls the connection of the device to the network service provider. The network service provider controls each device and/or each user's access to the resources of the network service provider by, for example, denying access to a user or device as described below. Thus, the network service provider utilizes the device/user status provided by the client in order to effectively control network security and prevent fraud. Now, an example of the fraud detection server will be described.

Figure 4:
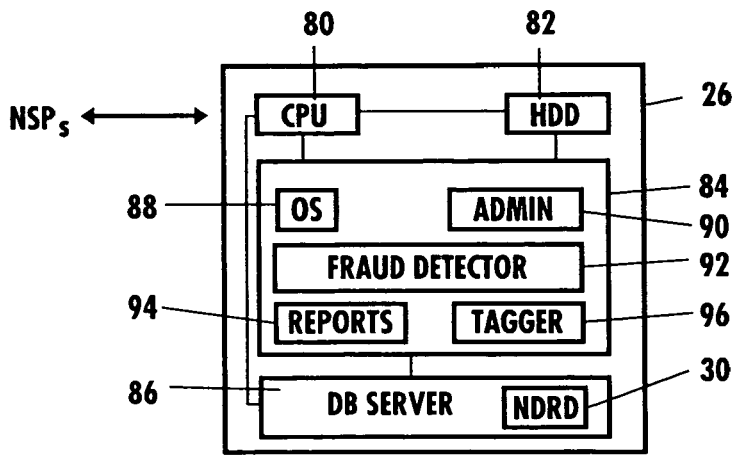
FIG. 4 is a diagram illustrating an example of the fraud detection server in accordance with the invention.

FIG. 4 is a diagram illustrating an example of the fraud detection server 26 in accordance with the invention. In this example, the fraud detection server 26 is a stand-alone computing resource, such as a server computer, with the NDRD 30, although the functions of the fraud server 26 and the NDRD 30 may be distributed as described above. The fraud server 26 may include one or more processors 80, one or more persistent storage devices 82 as described above and a memory 84 as described above. The fraud server may further include a database server/manager 86 that stores the NDRD 30 in accordance with the invention. The structure and operation of the processor, persistent storage device and memory are described above. The memory may store a server operating system 88, an administrator software module 90, a fraud detector software module 92, a reports software module 94 and a tagger software module 96 wherein each module comprises a plurality of instructions (and associated data) that are executed by the processor to implement the fraud detection and preventing system. In accordance with the invention, the client 72 downloaded to the device may perform the "tagging" of each device wherein the client may determine if the device already has a unique identifier from the server 26 or will request a new unique identifier. The server operating system is well known. The administrator module 90, in a preferred embodiment, may generate administrator web pages that permit the user of the fraud detection and prevention system to interact with the system using the web pages and configure the system. For example, the administrator web pages may permit the user to configure items of the system, adjust query items and update items. In configuring the items of the system, the user may toggle the master verify on and off wherein an OFF setting will always accept a new user or network device for access to the network. The user may also configure the maximum number of users (different, distinct user names) that can share a particular network device/results and the maximum number of network devices that a single user may use. If the maximum threshold set above is exceeded and the master verify is ON, then the fraud detection and prevention system may restrict access for the network device or user that has exceeded the threshold values. The user may also set whether a status of each user of a particular network service provider may influence the fraud detection operations, such as permitting account creation, permitting login, permitting a deposit into an account or permitting a withdrawl from an account. The administrator module also permits the user to configure the query items that extract information from the database of the fraud detection and prevention system. For example, the user may generate a query of, given a particular network device, what users have used that network device or a query that asks, given a particular user, what network devices have been used by the particular user. The user may also configure a query that asks, given a particular network device, what other network service providers set this network device to associate users/computers a predetermined number of levels deep or given a particular user, what is that user's current status in the system. The administrator module also permits configuration of the update items. For example, the user may set a particular network device to be always accepted for access to the system, set a certain network device to be accepted into the system, set a certain network device to be trapped by the system (to further determine the intentions of the network device), set a certain network device to be rejected by the system or set a given user to be always accepted by the system (e.g., all network devices associated with the user are always accepted). The user may also set a given user to be accepted for a predetermined interval or a predetermined access attempt (the network devices associated with the user are accepted), set a given user (and all of the network devices associated with the user) to be trapped or set a given user (and all of the network devices associated with the user) to be rejected. Hosts may set up any number of device and user status levels, and establish any number of behavior patterns, each of which might require a different action, such as notify a particular email address, page a particular number, deny access to the network, allow access but change the status of the device, etc.

The reports software module 94 permits a user to configure and generate reports from the fraud detection and prevention system and its database. For example, the system may generate a report showing the daily change report (with a list of the network devices whose status has changed), a third party fraud report listing the network devices that other network service providers know about and their status, or a shared computer report listing all of the network devices that have multiple user accounts associated with them. The reports module may also generate a multiple computer report listing the users that have used multiple network devices and the network devices used by each user and a usage report listing the number of administrator queries, administrator updates, API queries and number of network devices being tracked by the fraud detection system. The fraud detector software module 92 contains the instructions and logic, based on the data from the network devices and users, to determine the appropriate status of a particular user/network device and its access status into the electronic transaction system. In accordance with the invention, each network service provider may establish its own status rules. For example, a particular network service provider may establish a "Yes" or "No" to connect to the network service provider. As another example, a particular network service provider may have a "Yes to connect, but generate a score for the particular network device" status or a "Yes, but trap the information about the network device" status. The fraud detection logic is described below in more detail.

The tagger software module 96 contains the various software, logic and data to uniquely identify each network device (generate the identifier for a particular network device) that is making a connection to the electronic transaction system. The connection to the system may include, but are not limited to, an initial connection to the network, account set up, login, change to account information, deposit, withdrawal, purchase, randomly throughout connection to network, etc. In accordance with the invention, the actual method for tagging each network device may vary, as described below. In accordance with the invention, each network device is uniquely identified that each device is tracked within the system even when a different user logs into a Host with the same network device. Tagging individual network devices enables the fraud detection system to deny access to a Host for a particular user (regardless of the network device being used), for a particular network device (regardless of the user using the network device), for the combination of a particular user with a particular network device, or any combination of users and devices. Now, examples of the user database in each network service provider and the network device registration database of the fraud detection system will be described in more detail.

Figure 5:
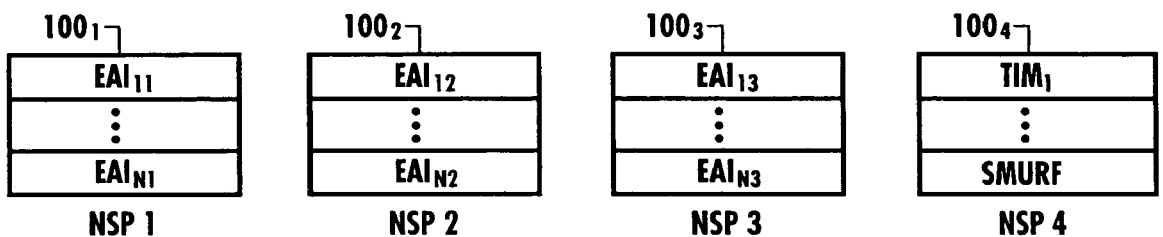
FIG. 5 illustrates examples of a portion of a database for each network service provider.

FIG. 5 illustrates examples of a portion of a database $100_1$, $100_2$, $100_3$, $100_4$ for each network service provider (NSP 1, NSP 2, NSP 3 and NSP 4) in an electronic transaction system that has four network service providers. In accordance with the invention, the information contained in these databases is forwarded onto the fraud detection system so that the fraud detection system can distinguish users of each network service provider from the users of other network service providers. Each network service provider has an end-user account identifier (EAI), such as $EA_{11}$-$EAI_{n1}$, $EAI_{12}$-$EAI_{n2}$, $EAI_{13}$-$EAI_{n3}$ and $EAI_{14}$-$EAI_{n4}$. In this example, NSP 1, NSP 2, and NSP 3 use a separate EAI that provides no information about the users account, whereas NSP 4 utilizes the end-user's actual UserID ("Tim1" and "Smurf") as the EAI. All that is required by the fraud system is that each host provides an EAI that has a direct relationship with a unique account on that host.

Figure 6:
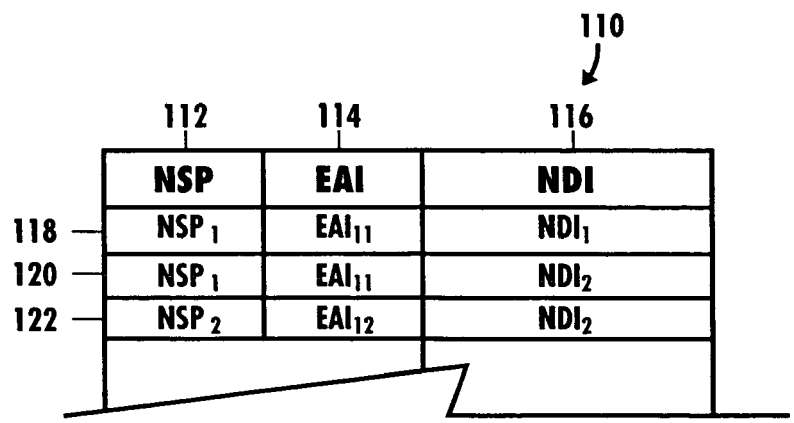
FIG. 6 is a diagram illustrating an example of a network device registration database in accordance with the invention.

FIG. 6 is a diagram illustrating an example of a populated network device registration database 110. In this example, the database is a database table containing the pertinent information. However, the data may be stored in different databases and different database data structures that are within the scope of this invention. In this example, the NDRD 110 may include a Host column 112, an EAI column 114 and a network device identifier (NDI) column 116 that permit the fraud detection system to associate a particular Host with a particular user and a particular network device.

As described above, the EAIs represent end-user accounts that are unique to each Host. The network device identifiers (NDIs) represent unique network devices that have connected to at least one Host. The individual rows in the database table represent unique combinations of Host, EAIs and NDIs. For example, a first row 118 represents an $EAI_{11}$ to $Host_1$ from $NDI_1$ represents an account coming from a specific device (ND1) and attempting to connect to Host 1. If this same account connected to Host 1 from a different device, a new row 120 would be created, for example $EAI_{11}$ to $Host_1$ from $NDI_2$ so that the access by the same user via two different network devices is tracked and registered in the system. If the end-user represented by $EAI_{11}$ on $Host_1$ has an account with $Host_2$ (shown as $EAI_{12}$ since each Host has its own unique EAIs) and connects to $Host_2$ from $NDI_2$, a new entry 122 would be created, such as $EAI_{12}$ to $Host_2$ on $NDI_2$ so that the same user connecting to a different network service provider with the same network device is tracked and registered in the fraud system. A great deal of additional information may be maintained such as last successful login date and time, last unsuccessful login date and time, total successful logins, total unsuccessful logins, etc. Now, a method for network device registration in accordance with the invention will be described in more detail.

Figure 7:
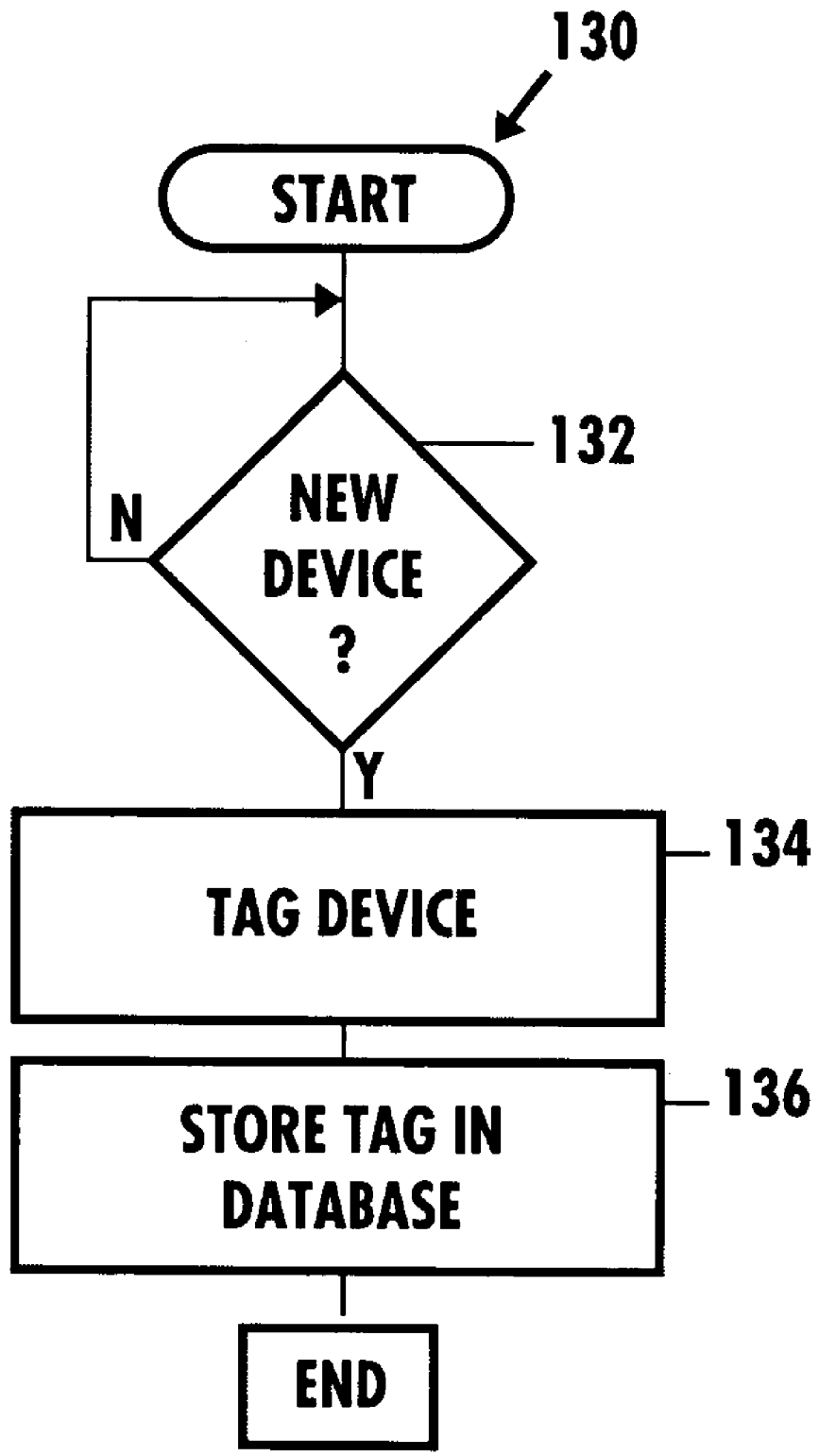
FIG. 7 is a method for tagging a network device in accordance with the invention.

FIG. 7 is a method 130 for tagging a network device (network device registration method) in accordance with the invention. The method achieves the goal of uniquely identifying each network device that connects to the electronic transaction system that the fraud detection and prevention system is guarding. Ideally, this method is performed every time a device connects to a Host protected by this system, and may also be performed at various points and intervals throughout a session. For example, the system can periodically perform the method to periodically check each device connected to the network. Thus, in step 132, the method determines if the network device is new (e.g., if the network device is already registered in the NDRD and already has been assigned a unique identifier). If the network device is new and does not have a unique fingerprint, then, in step 134, the method generates a unique fingerprint (tag) for the network device. The unique fingerprint may be generated by the client program 54 in each network device (in the example shown in FIG. 2) or by other means such as the fraud server 26 generating a fingerprint for each network device based on information received from the network device or any combination. The unique fingerprint is then stored in the database in step 136 and the method is completed so that each unique network device in the system is uniquely identified.

Thus, when a network device attempts to connect to a network for the very first time, the method ensures that the device is registered (and therefore tracked) in at least two separate ways. First, the method requests a unique Network Device Identifier (NDI) from the NDRD 30 through the Host. The method obtrusively stores the encrypted NDI in at least two pieces; for example Part A in the registry and Part B in a file. The NDIs are distributed by NDRD and are guaranteed to be unique. The method also generates a Network Device Fingerprint (NDF) for each device by unobtrusively gathering information about the device, such as hardware serial numbers, software serial numbers, install dates, and other information, and sends the resulting NDF to NDRD through the Host (the network service provider). Although the individual components of an NDF are not guaranteed to be unique, increasing the size of the NDF or number of elements of information used to create the NDF increases the likelihood that the resulting NDF is unique and increases its value for positive identification. In accordance with the invention, the combination of the NDI and the NDF is unique and permits each network device to be uniquely identified. Thus, the NDI shown in FIG. 6 includes the NDF since the combination will uniquely identify a network device.

The exact methodology for registering a device is not critical, provided that it uniquely identifies devices with an extremely high likelihood. For example, various methods for uniquely identifying devices may be slightly different to accommodate unique aspects of thin clients, handheld computers, cell phones, game terminals, and other device types. All of these variations are within the scope of the invention. In a preferred embodiment, the client program 54 may gather information for each network device in order to generate the NDF. It is very likely that hosts utilizing this system may distribute a common registration method in different ways, depending on end-user characteristics and typical platforms used to connect to their network, or even execute the registration method remotely. However, those skilled in the art will also appreciate that any system that uniquely identifies and registers a network device with a centralized NDRD (whether through an intermediate Host or through direct communications) are within the scope of this invention.

In addition to facilitating communication between NDRM and NDRD, the network service provider Host also passes an End-user Account Identifier (EAI) to the NDRD associated with the specific end-user account that is trying to access/connect to the network service provider. This identifier may be a customer account number, or other unique value associated with a specific end-user account that is not used in the Host system for any other purpose. Depending on the business relationship between Host and NDRM service provider, actual customer information may or may not be registered. However, whether or not actual customer information is provided does not substantively change the process. In accordance with the invention, the NDRD tracks every network device (having a unique NDI) that tries to connect to a Host, along with its corresponding NDF. The NDRD also maintains an association for every EAI that connects from every unique network device. The NDRD also tracks information such as first connection, last connection, total connections, last failed connection, total failed connections, NDI status by Host, and NDF status by Host. In accordance with the invention, the system may utilize the NDI, the NDF, the combination of the NDI and NDF or other information in order to validate a user/device. For example, the other information may be a serial number of a cell phone. Now, an example of the preferred database schema of the fraud detection system will be described in more detail.

Figure 8A:
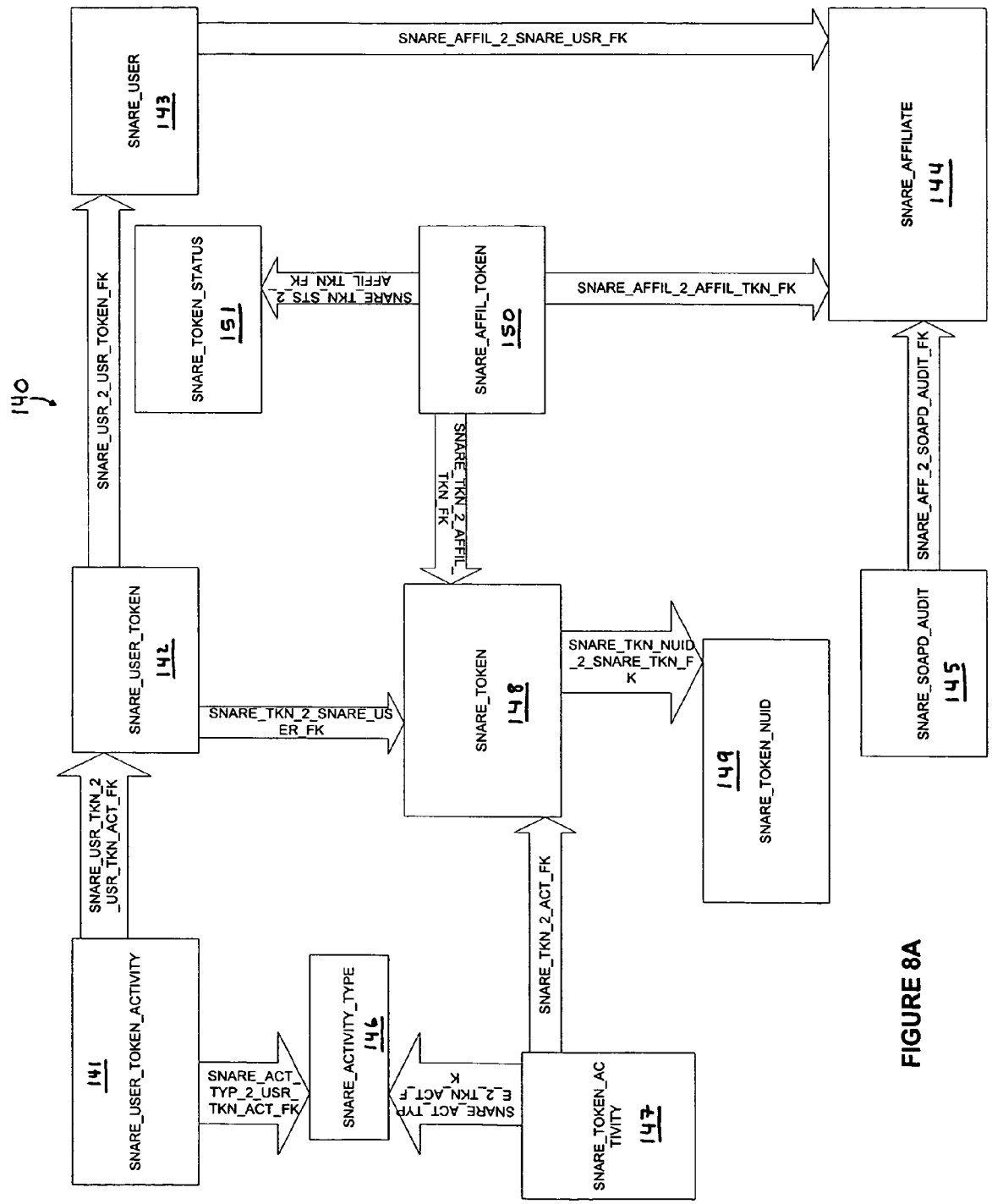
FIG. 8A is a diagram illustrating the relational database tables for an example of a preferred embodiment of a database schema for a fraud detection system in accordance with the invention.

FIG. 8A is a diagram illustrating the relational database tables for an example of a preferred embodiment of a database schema 140 (for the ieSnare product of iovation, inc.) for a fraud detection system in accordance with the invention and FIGS. 8B-8E are diagrams illustrating further details of the database tables shown in FIG. 8A. As shown in FIG. 8A, the database schema 140 may include a plurality of database tables including a SNARE_USER_TOKEN_ACTIVITY table 141, a SNARE_USER_TOKEN table 142, a SNARE_USER table 143, a SNARE_AFFILIATE table 144, a SNARE_SOAPD_AUDIT table 145, a SNARE_ACTIVITY_TYPE table 146, a SNARE_TOKEN_ACTIVITY table 147, a SNARE_TOKEN table 148, a SNARE_TOKEN_NUID table 149, a SNARE_AFFIL_TOKEN table 150 and a SNARE_TOKEN_STATUS table 151 that are linked together by at least a primary key such as SNARE_USR_TKN_2_USR_TKN_ACT_FK as shown. The various primary keys between each table in the database schema are not described here, but appear in FIG. 8A. In these database tables, the TOKEN variable corresponds to the NDI described elsewhere in this document and the NUID variable corresponds to the NDF described elsewhere in this document.

Figure 8B:
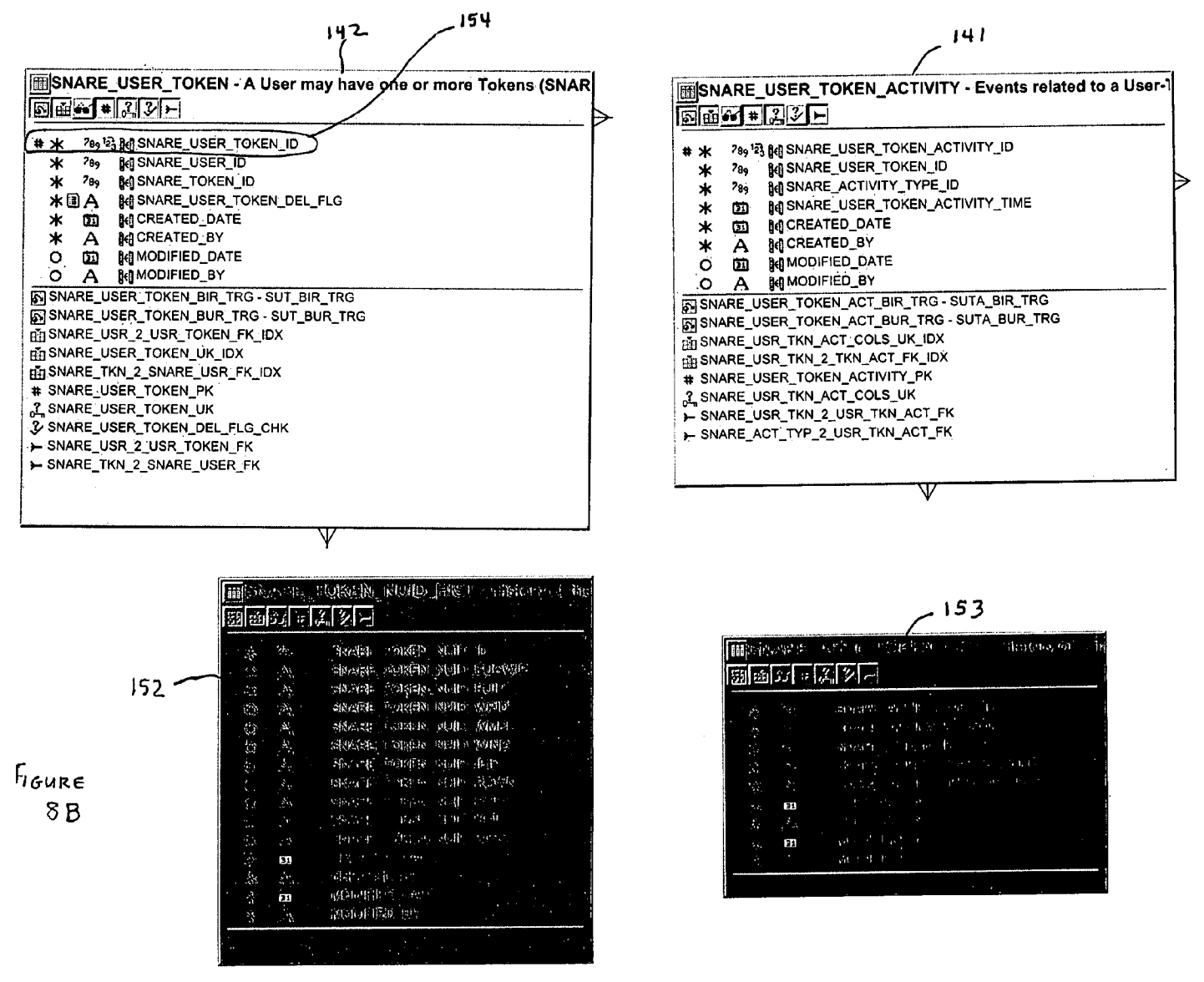
Figure 8E:
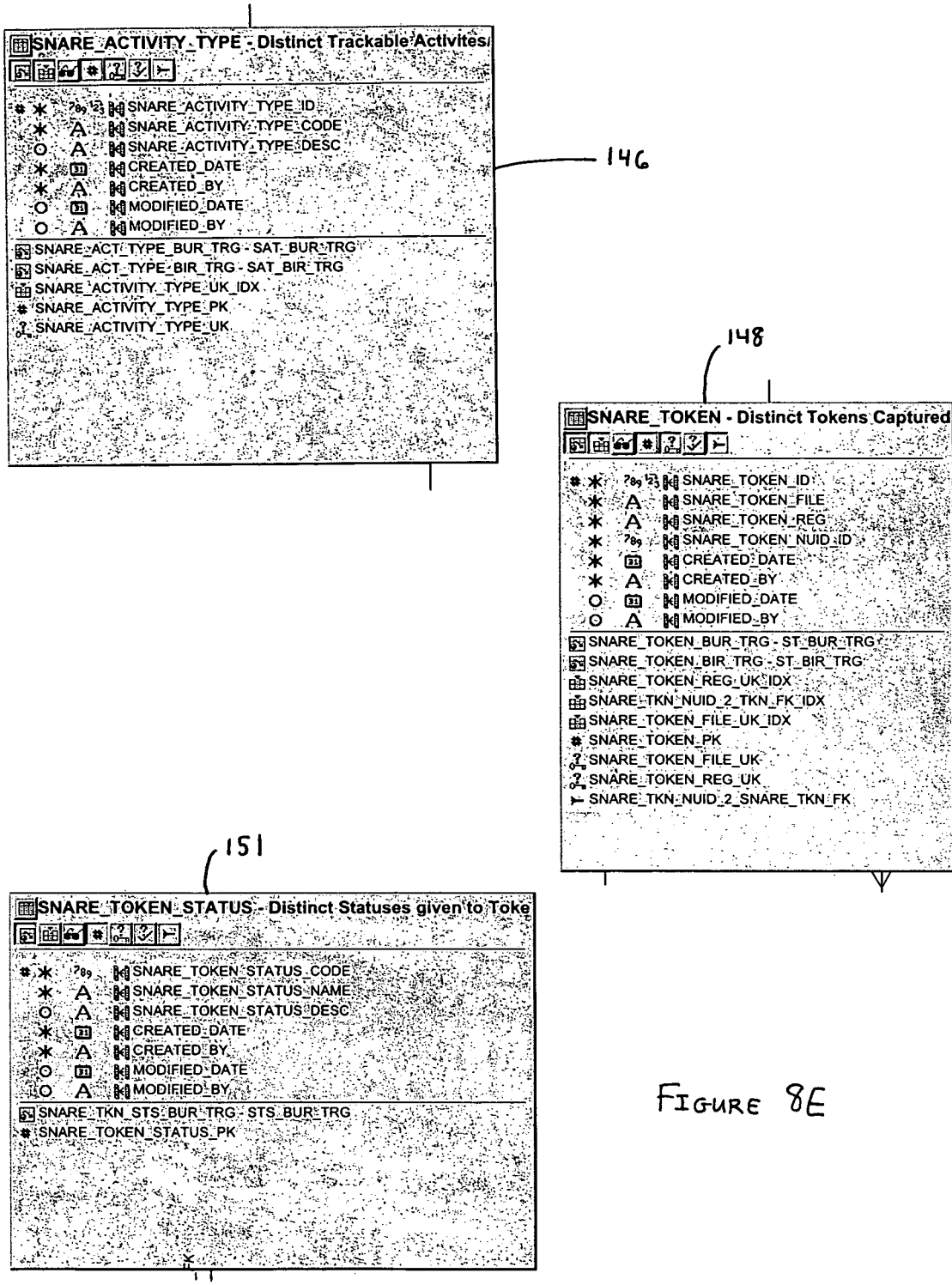

FIG. 8B illustrates more details of the SNARE_USER_TOKEN table 142 and the SNARE_USER_TOKEN_ACTIVITY table 141 along with a SNARE_TOKEN_NUID_HIST table 152 and a SNARE_AFFIL_TOKEN_HIST table 153 that are not shown in FIG. 8A. As shown in FIG. 8B, each data field 154 in each table is shown wherein each data field contains various characteristics, such as the type of data stored in the field, etc . . . . In accordance with the invention, each user of the system may have one or more tokens (identifiers) that are stored in the SNARE_USER_TOKEN table 142 and any events related to a particular token for a particular user are stored in the SNARE_USER_TOKEN_ACTIVITY table 141. The HIST tables 152, 153 contain historical data about the tokens and the affiliate tokens. FIG. 8C illustrates more details of the SNARE_USER table 143 (that contains data about each user of the system), the SNARE_SOAPD_AUDIT table 145 (that contains debug information for the system) and the SNARE_AFFIL_TOKEN table 150 that contains the one or more tokens (identifiers) for each affiliate of the system wherein the affiliate is a particular network service provider. FIG. 8D illustrates more details of the SNARE_AFFILIATE table 144 (that contains data about each affiliate associated with the system), the SNARE_TOKEN_ACTIVITY table 147 (that contains data about any events pertaining to a particular token) and the SNARE_TOKEN_NUID table 149 that contains data about the fingerprint for a network device for a device with a particular token/NDI. Finally, FIG. 8E illustrates more details of the SNARE_ACTIVITY_TYPE table 146 (that contains data about each unique/distinct trackable activities occurring in the system), the SNARE_TOKEN table 148 (that contains data about each token stored in the system) and the SNARE_TOKEN_STATUS table 151 that contains unique/distinct statuses for each token in the system.

Figure 9A:
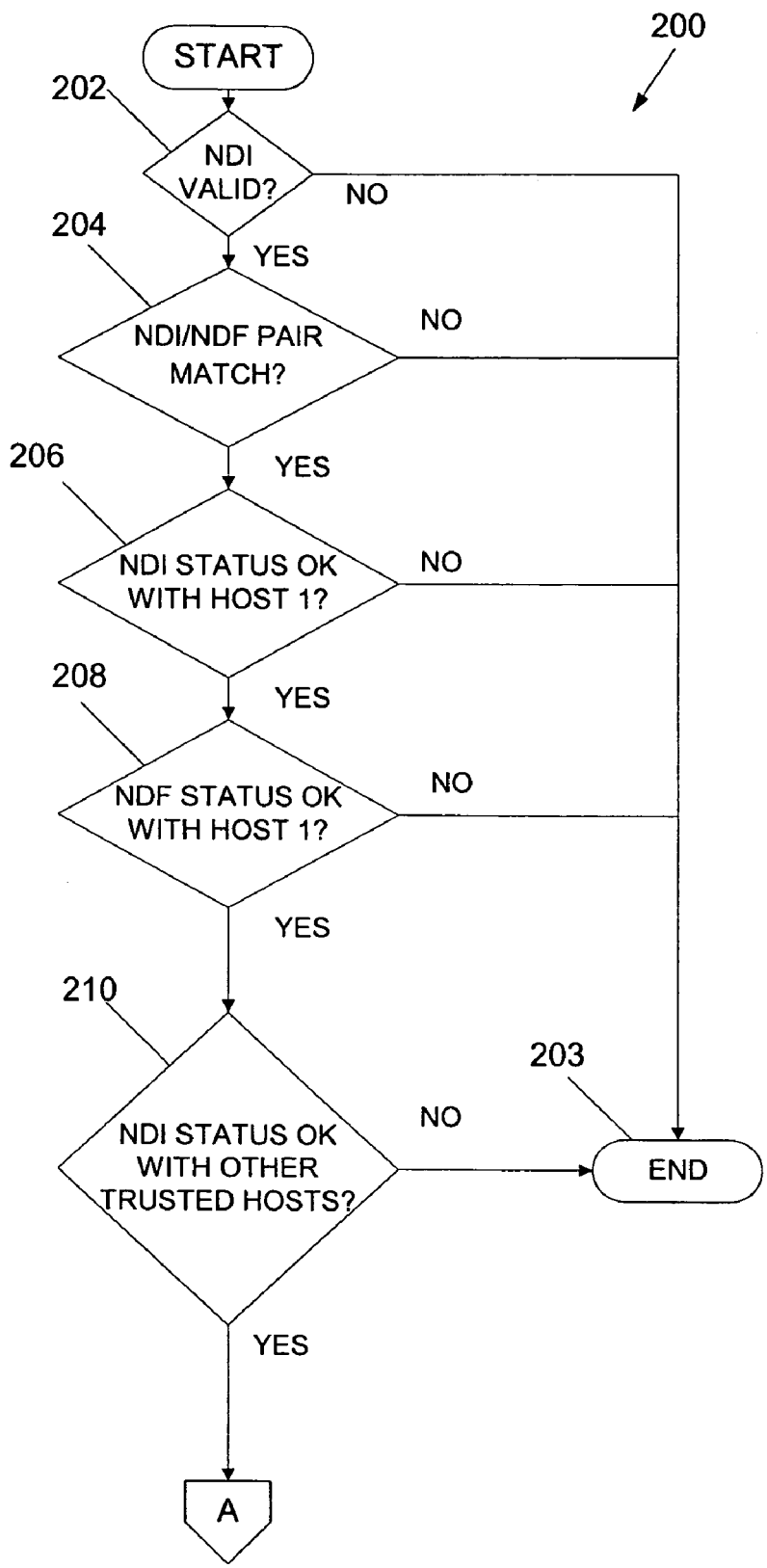
FIGS. 9A and 9B are a flowchart illustrating a preferred method for validating an account using the fraud detection and prevention system in accordance with the invention.
Figure 9B:
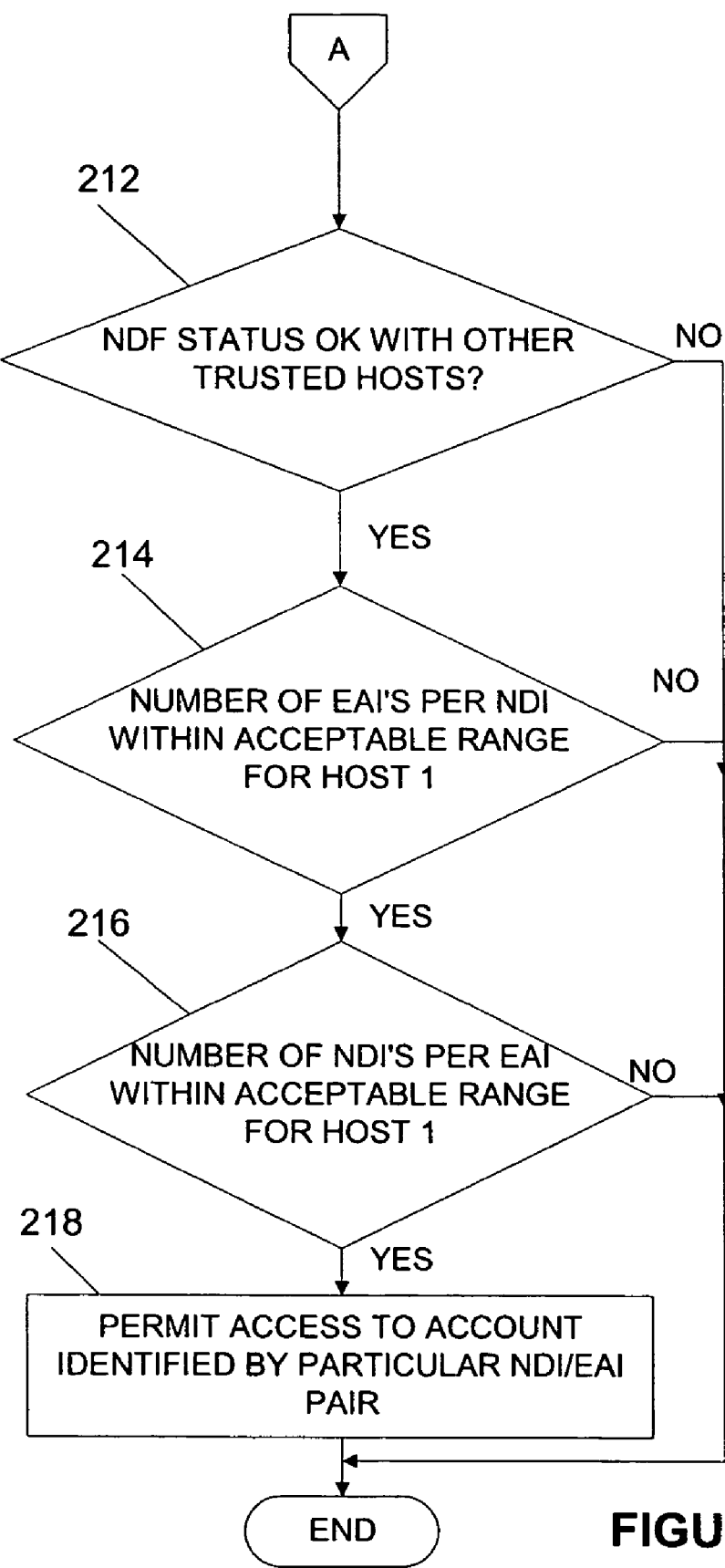

FIGS. 9A and 9B are a flowchart illustrating a preferred method 200 for validating a device and device/account correlation where a Host is using the fraud detection and prevention system in accordance with the invention. FIGS. 9C-9F illustrate methods for validating a new user/device and an existing user/device in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In operation, prior to an account (a particular network device with a particular end user account identifier) being authorized by a particular Host (network server provider), a series of validation steps occur each time. If the particular network device or device/account correlation being tested fails to satisfy any of the validation steps described below, the validation is aborted and the device/account is denied access to the particular Host. The validation steps may be initiated by hosts at any number of customer interaction points, including but not limited to initial connect to network, account set up, login, change to account information, deposit, withdrawal, purchase, randomly throughout connection to network, etc. In more detail, in step 202, it is determined if the network device identifier (NDI) is valid. In more detail, the NDI must appear unaltered, be of a value originally issued by the NDRD, and not appear to be currently logged into the same Host. An invalid NDI will not be allowed to connect to the Host as shown in step 203. If the NDI is valid, then in step 204, it is determined if the NDI/network device fingerprint (NDF) pair match. In particular, the NDF provided at login must match the NDF value originally associated with the NDI of the network device trying to connect to Host. However, some change in the NDF is permitted. For example, 'NDF drift' must be considered as individual elements that are used to calculate an NDF can change over time. Generally, additional elements not present in the original NDF, such as a new piece of software or hardware has been installed, are not worrisome. In these cases, the NDF is updated, and the changes noted. However, changes to existing individual NDF values are more worrisome. In accordance with the invention, each Host may establish rules for system drift and which one or more elements of the NDF they perceive as critical and therefore should not be changed without causing an exception/error message. For example, the serial number of the central processing unit may be considered critical and therefore will generate an error message (a mismatched ND/NDF pair) while a change in the amount of memory in the network device alone may not cause a mismatched NDI/NDF pair. As another example, several non-critical elements of the network device may be changed, but the NDF/NDI pair will still be considered to be matching. Thus, depending on rules established and maintained by each Host, a NDI/NDF pair may be considered mismatched and not allowed to connect to Host in step 203.

In step 206, if the NDI/NDF pair match, it is determined if the NDI status is acceptable to the particular Host. In particular, an individual network device may connect to several networks protected by this system, and therefore the particular NDI may be associated with multiple hosts. In accordance with the invention, each NDI has a status for each Host using NDRD, and each Host defines any number of statuses for NDIs. When a network device is trying to connect to Host 1, NDRD follows any rules associated with the NDI status for Host 1. For example, Host1 may establish just two status levels, one to allow access and one to deny access. Host2 may establish a single set of several status levels, where each status has a different set of criteria and where each status determines which area of their network a device/account is allowed to access. Host3 may have several sets of statuses, where set1 applies to connecting to the network, set2 applies to accessing various areas of the network, and set3 applies to various activities on the network (such as establish a new account, change account info, purchase, etc.) and where each status has a unique criteria established and maintained by Host3. If the NDI status is not acceptable to the particular Host, the method is aborted in step 203 and access is denied. In step 208, if the NDI status is acceptable to the Host, it is determined if the NDF status for the particular network device is acceptable for the particular Host. In particular, each NDF also has a status for each Host using the NDRD, and each Host defines any number of statuses for the NDFs. When a network device is trying to connect to Host 1, NDRD follows any rules associated with the NDF status for Host 1. As with status levels and associated rules for NDIs, the hosts may establish any number of status levels for NDFs appropriate to their purpose. If the NDF status is not acceptable to the particular Host, the method is aborted in step 203 and access is denied. These two steps (206, 208) are one line of defense against hackers that remove all traces of NDIs and try to connect to a protected network. In extreme cases, a new NDI might be issued to a network device, but access to the network might still be denied depending on the status of the NDF controlled by each Host, both manually and in rules established with NDRD.

In step 210, if the NDF status for the network device is acceptable to the particular Host, it is determined if the NDI status for the particular network device is acceptable for any other Host identified by the particular Host as being trusted. In particular, individual network devices may connect to several networks protected by this system and therefore the NDI may be associated with multiple hosts. Upon trying to connect to Host 1, the NDI status for Host 1 may be clear, while the NDI status for other hosts is marked as 'bad'. In accordance with the invention, each Host can identify other hosts that are 'trusted', whereby if the NDI status is 'bad' for any other trusted Host, network access would be denied independent of the NDI status for Host 1. This step prevents fraud by a user that might have a bad status on a first network service provider but not on a second network service provider and thus shares information about a "bad" network device that is identified by a particular NDI. If the NDI status is not acceptable to any trusted hosts, the method is aborted in step 203 and access is denied.

In step 212, if the NDI is acceptable to all trusted hosts, it is determined if the NDF status is acceptable to any other hosts that are indicated as "trusted" by the particular Host. In particular, individual network devices may connect to several networks protected by this system, and therefore a particular NDF may be associated with multiple hosts. Upon trying to connect to Host 1, the NDF status for Host 1 may be clear, while the NDF status for other hosts is marked as 'bad'. Each Host can identify other hosts that are 'trusted', whereby if the NDF status is 'bad' for any other trusted Host, network access would be denied independent of the NDI status for Host 1. This step shares information about the NDF statuses of network devices across the electronic transaction system. If the NDF of the particular network device is not acceptable to a trusted Host, the account with the NDF is denied access. In step 214, if the NDF is acceptable to all of the trusted hosts, then it is determined if the number of end user account identifiers (EAIs) per NDI is within the acceptable range for the particular Host. In particular, each Host establishes rules for the number of EAIs allowed per NDI, or in other words the number of users that can use an individual network device. For example, Host 1 may not be worried about 3 or fewer accounts coming from an individual PC, may want to be warned about 4-6 accounts coming from a PC, and may want to deny network access to any login attempt where 7 or more accounts are coming from the same PC. For each set of rules, different levels of concern and different remedies (no action, warning or denial of access) may be put into place and the particular levels of concern and remedies may be adjusted by each Host in accordance with the invention. As another example, another Host may allow only one account per network device and deny access to any login attempt where more than one account has tried to connect from the same network device.

In step 216, it is determined if the number of NDIs per each EAI is within the acceptable range for the particular Host. In particular, each Host also establishes rules for the number of NDIs from which each EAI is allowed to connect, or in other words the number of different network devices from which an individual account is allowed to connect. For example, Host 1 may not be worried about an account coming from 5 or fewer PCs, may want to be warned about an account using 6-10 PCs, and may want to deny network access to any login that has attempted to connect from 11 or more PCs. Another Host may allow only one account per PC, and deny access to any login attempt coming from a second network device. Thus, these levels of concern and remedies are adjustable by each Host in accordance with the invention. In step 218, the account identified by the particular NDI and EAI pair (which has met all of the tests set forth above) is permitted access to the system of the particular network service provider and the data about the transaction/connection is entered into the NDRD.

Figure 9C:
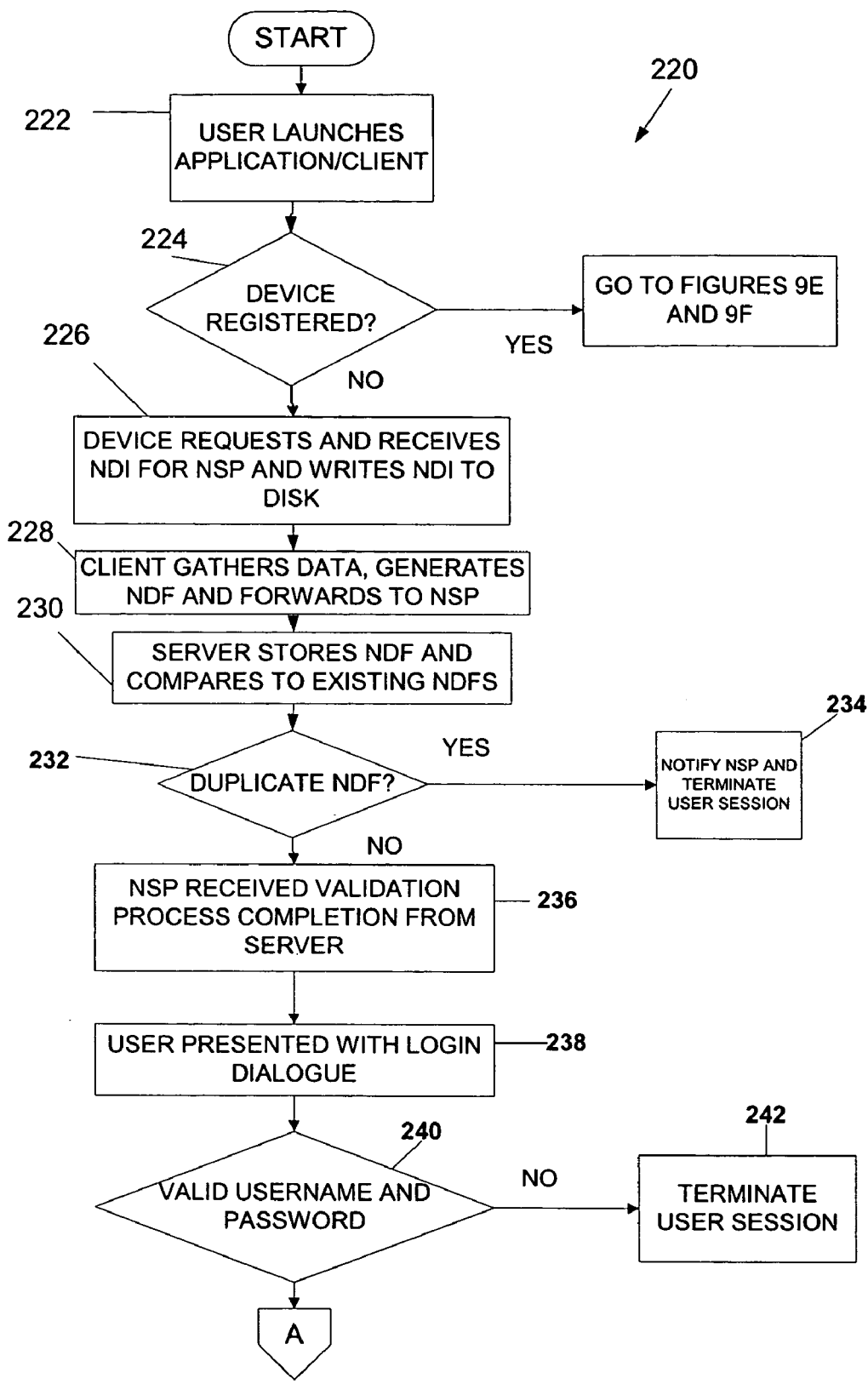
FIGS. 9C and 9D are a flowchart illustrating a preferred method for validating a new user/device using the fraud detection and prevention system in accordance with the invention.
Figure 9D:
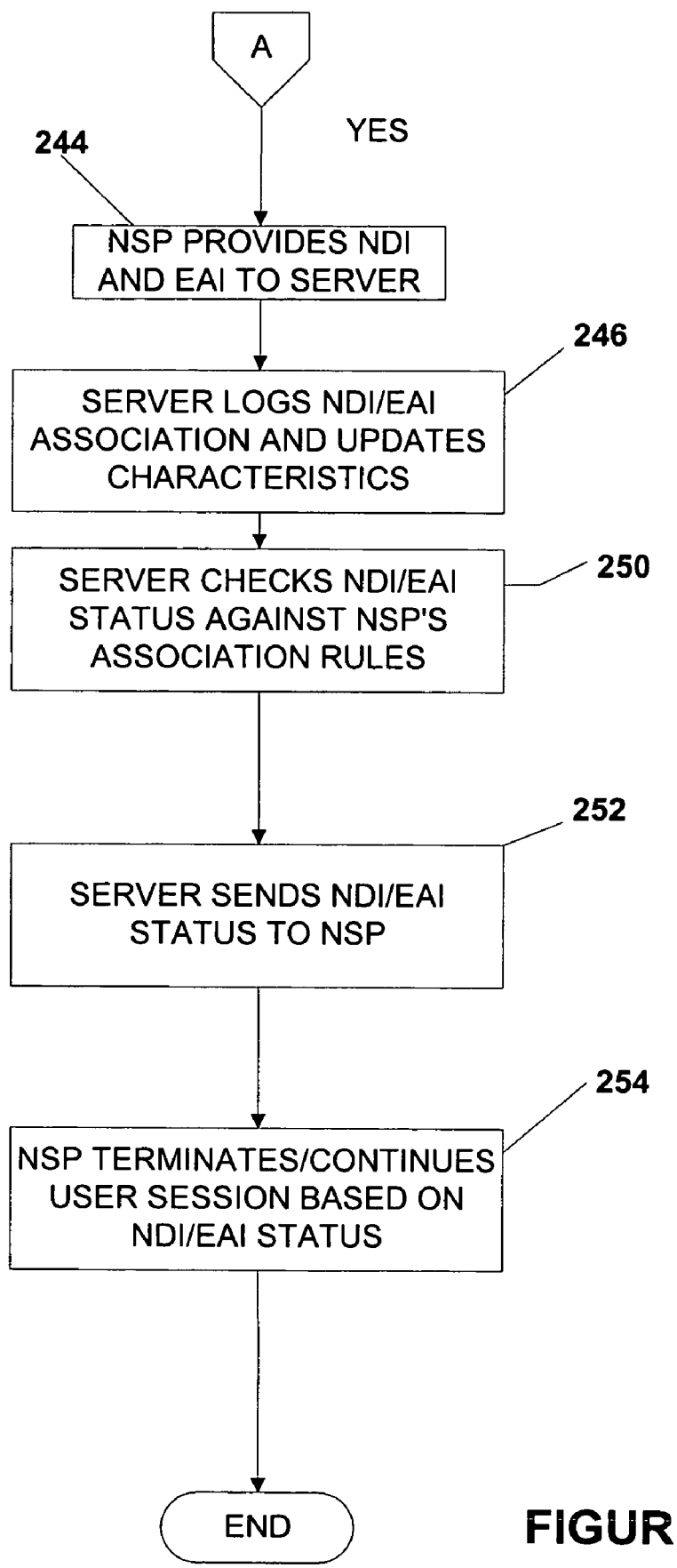

FIGS. 9C and 9D are a flowchart illustrating a preferred method 220 for validating a new user/device using the fraud detection and prevention system in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In step 222, a user launches an application (after downloading the application from the network service provider in the embodiment in which the client is embedded in an application) and the application automatically launches the client. In step 224, the client determines if the device is registered with the fraud detection system. If the device is already registered, then the method is completed and method for validation an existing user is set forth in FIGS. 9E and 9F. If the client does not detect that the device is already registered, then in step 226, the client requests a new NDI (identifier/token/serial number) from the network service provider who forwards on the request to the fraud server 26. The server generates a unique NDI and passes it onto the network service provider that then forwards the NDI onto the client. The client then stores the NDI onto its disk and into its registry. In step 228, the client gathers data from the device, generates an NDF and forwards that NDF onto the network service provider. In step 230, the network service provider forwards the NDF onto the server that stores the NDF and checks the NDF against existing NDF data for the status of the particular NDF.

In step 232, the server determines if the NDF is a duplicate such as if a hacker has deleted the previous NDI on the device, but the NDF was identical to an existing NDF. If there is a duplicate NDF, then the network service provider is notified in step 234 and the user session is terminated. In step 236, if the NDF is not duplicate (indicating a new device), the server returns a validation process acknowledgment message to the network server provider. In step 238, the user is presented with a login dialog by the network service provider. In step 240, the network service provider determines if a valid username and password are provided. If an invalid username or password is provided, the user session is terminated in step 242. In step 244, if a valid username and password are provided, the network service provider sends the NDI of the device and end-user account information (EAI) generated by the network service provider to the server. In step 246, the server logs the NDI and EAI association into its database and updates various information for the device such as the last successful login date/time, total logins and other data about the device. In step 250, the server checks the NDI and EAI status against the parameters of the network service provider. In step 252, based on the network service provider rules, the server sends the NDI/EAI status to the network service provider. In step 254, the network service provider terminates/continues the user session based on the NDI/EAI status returned from the server. Now, a method for validating an existing user/device will be described in more detail.

Figure 9E:
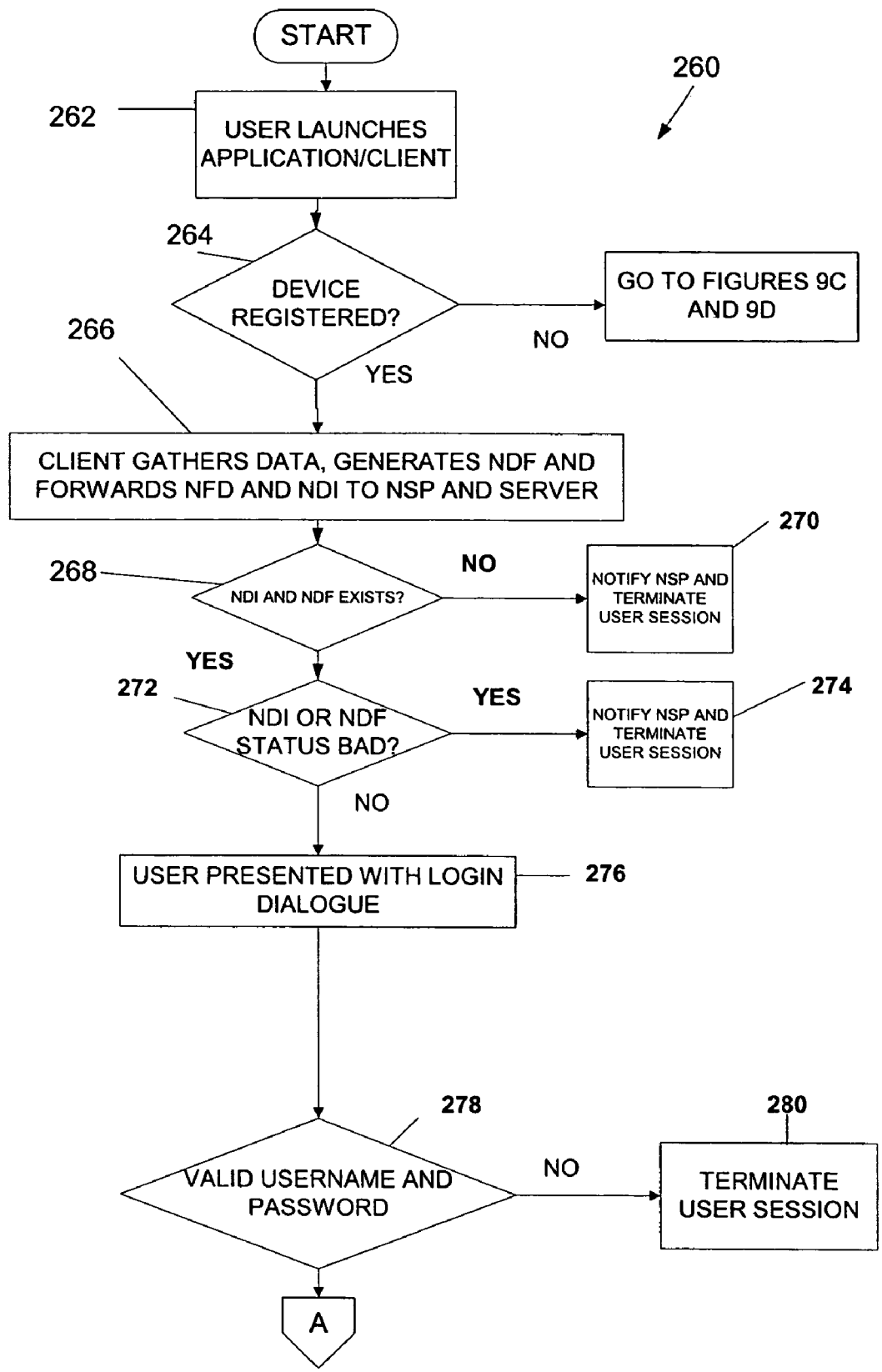
FIGS. 9E and 9F are a flowchart illustrating a preferred method for validating an existing user/device using the fraud detection and prevention system in accordance with the invention.
Figure 9F:
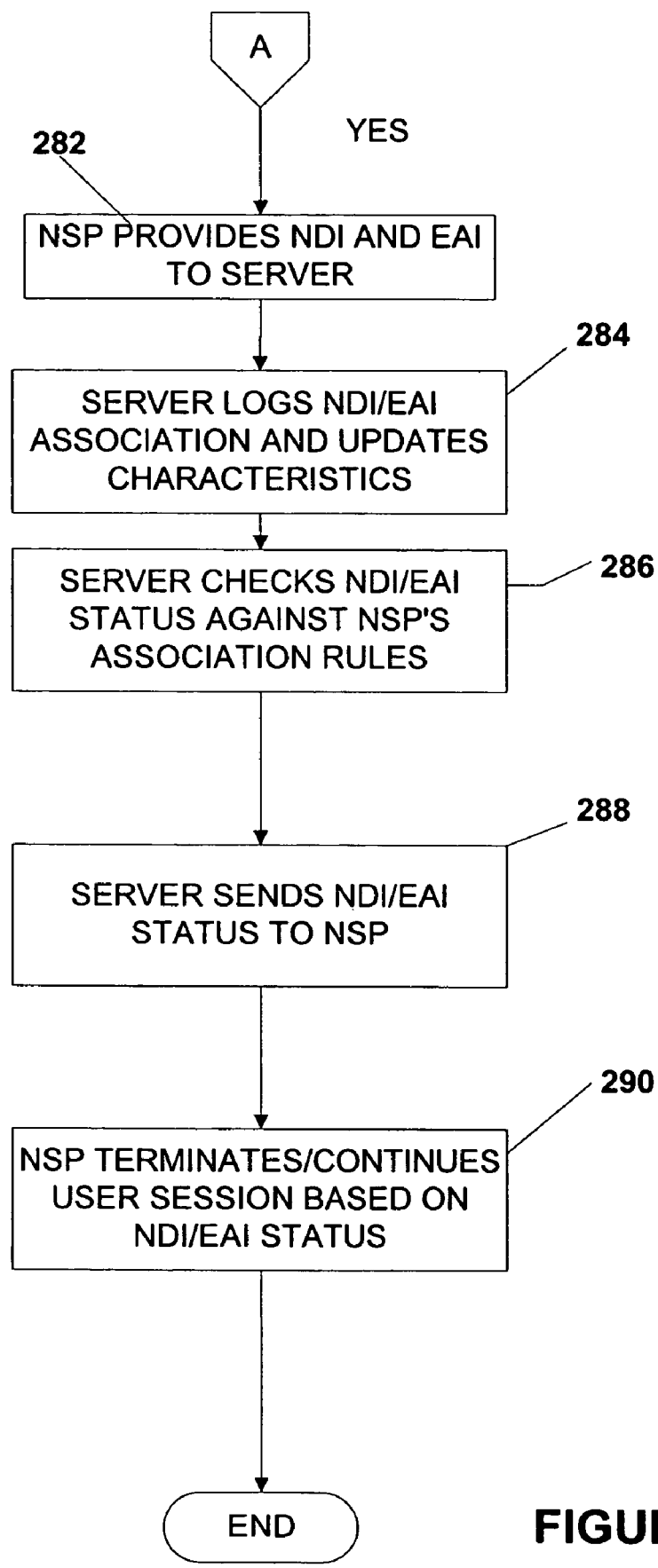

FIGS. 9E and 9F are a flowchart illustrating a preferred method 260 for validating an existing user/device using the fraud detection and prevention system in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In step 262, a user launches an application (after downloading the application from the network service provider in the embodiment in which the client is embedded in an application) and the application automatically launches the client. In step 264, the client determines if the device is registered with the fraud detection system. If the device is not already registered, then the method is completed and method for validation a new device is set forth in FIGS. 9C and 9D. If the device is already registered, then in step 266, the client gathers data from the device, generates an NDF and forwards that NDF and the already assigned NDI onto the network service provider. The network service provider then forwards the NDF and NDI onto the server that stores the NDF and checks the NDF against existing NDF data for status of the particular NDF.

In step 268, the server determines if the NDF and the NDI pair exists in the database. If there is not a match in the database, then the network service provider is notified in step 270 and the user session is terminated. In step 272, the server determines if the NDI or NDF status is bad and, if the status of either is bad, the network service provider is notified and the user session is terminated in step 274. If the NDI and NDF statuses are good, then in step 276, the user is presented with a login dialog by the network service provider. In accordance with the invention, the client and/or the validation system may also present the login to the user and perform the user login process in addition to the validation processes. In step 278, the network service provider determines if a valid username and password are provided. If an invalid username or password is provided, the user session is terminated in step 280. In step 282, if a valid username and password are provided, the network service provider sends the NDI of the device and EAI to the server. In step 284, the server logs the NDI and EAI association into its database and updates various information for the device such as the last successful login date/time, total logins and other data about the device. In step 286, the server checks the NDI and EAI status against the parameters of the network service provider. In step 288, based on the network service provider rules, the server sends the NDI/EAI status to the network service provider. In step 290, the network service provider terminates/continues the user session based on the NDI/EAI status returned from the server.

Several examples of the operation of the above method will now be provided. As described above, each Host will establish its own customized rules for every aspect of the present validation method. Because of this, the same circumstances that result in denied access for an end-user on one Host may not result in denied access on another Host. Thus, the following examples are simply intended to illustrate some of the ways in which the present invention might be utilized.

Host1 identifies a problem with an account identified by an EAI of EAI2004. After closing the account within Host1's system, a Host1 administrator logs into the NDRD and searches the NDRD using a user interface to identify four additional NDIs used by EAI2004, and changes the status of each NDI such that they will never be allowed to connect to Host1. In addition, the administrator identifies 2 other EAIs that have used these NDI's to connect to Host1. After researching the newly identified accounts, they are determined to be potentially fraudulent and also closed. Thus, the user is able to identify an account, its associated network devices and other EAIs associated with the identified network devices that will be denied access to the system. In a first example, an end-user attempts to connect to Host1 from a NDI that has been identified by Host1 as having been used in a fraudulent transaction. Based on the status set by Host1, the user is denied access to the network. In a second example, an end-user attempts to connect to Host1 from a NDI that has been identified by Host1 as having been used in a suspicious manner. Based on the status set by Host1, the user is allowed access to the network, but for every valid login and password combination provided by the end-user, that account is automatically disabled on Host1's system, and the user is prompted for a different user name and password.

In a third example, an end-user attempts to connect to Host1 from a NDI that has been identified by Host2 as having been used in a fraudulent transaction. Based on the NDI status set by Host2, and the fact that Host1 has identified Host2 as trusted, the user is denied access to the network. In addition, the NDI status for Host1 is changed to 'bad' and the end-user's account is closed on Host1's system. In a fourth example, an end-user attempts to connect to Host1 from a NDI that has been identified by Host3 as having been used in a fraudulent transaction. Because Host3 has not been identified as trusted by Host1, this condition is ignored and the user is allowed access to the network.

In another example, periodically, an administrator from Host1 receives a report from the NDRD of all NDI's identified by trusted hosts as 'bad' that have a status for Host1 of 'good', including all the EAI's for Host1 associated with these NDIs. The administrator researches these accounts to determine the appropriate course of action. The administrator may then, for example, change the status of the NDIs and EAIs to "bad", and research associated user accounts within their system to identify potential fraudulent accounts.

In another example, Host1 proactively screens account information for all accounts identified through the NDRD as sharing the same NDI, and suspicious accounts are identified for further investigation. For example, three accounts with stated addresses in three different countries that have logged in from the same network device would be identified as suspicious. Alternatively, the fraud preventing system may automatically and periodically generate information from the NDRD based on the particular Host's requests. Now, an example of the operation of an implementation of the fraud detection system in accordance with the invention will be provided.

Once a particular network service provider (NSP1) has integrated the fraud detection client and system into its system, the network service provider system may automatically request information. etc. from the fraud detection system. The request of information may occur for various reasons, such as a new customer installation, a customer login, a customer purchase/deposit attempt, and a customer refund/withdrawal attempt. In each situation, the network service provider's client software may invoke the fraud detection client that may return a set of information that the client software to pass onto a backend system. In an implementation of the system, the backend system of the network service provider may pass 1) a unique identifier (which will be provided to the network service provider that signs up for the service) that uniquely identifies the particular network service provider to the fraud detection system and permits the NDRD to store data according to the particular network service provider; 2) a unique "session identifier" to identify the particular user access session to the particular network service provider; 3) a unique customer identifier for the specific customer (if available, which it should be in all cases except new customer installation), such as the EAI; 4) an "action code" identifying the type of user account (see below); and 5) the information that the client provided via the API to the Server. The server may then respond via the API with an "action response" indicating a suggested course of action for the particular account, information that it wishes to pass through to the client, such as the ieSnare Client in a preferred embodiment of the invention, or both. Now, an example of the format of the API for the fraud detection system will be described in more detail.

In a preferred embodiment, the API uses extensible mark-up language ("XML") to pass information between the backend system of the network service provider and the fraud detection server. The API is a simple but powerful way to automate common queries and interpret their responses.

The API requests are typically formatted as follows:
<ieRequest>
<SnareID>SnareCustomerNumber</SnareID>
SessionID>Session Number</SessionID>
<CustomerID>Your Unique Customer Identifier (if not available, leave blank)</CustomerID>
<Action>Action Code Number</Action>
<Data>Information ieSnare Client provided</Data>
</ieRequest>

The API responses will typically be formatted as follows:
<ieResponse>
<SnareID>SnareCustomerNumber</SnareID>
<SessionID>Session Number</SessionID>
<CustomerID>Your Unique Customer Identifier (or blank if n/a)</CustomerID>
<ComputerID>Your Unique Computer Identifier</ComputerID>
<Response>Response Code Number</Response>
<Reason>Reason Code Number</Reason>
<PassData>Information to pass to the ieSnare Client (optional)</PassData>
</ieResponse> wherein the currently supported Action Code Numbers are:
1000—new account creation
2000—login attempt
3000—purchase/deposit attempt
4000—refund/withdrawal attempt
and the currently supported Response Code Numbers are:
0—ACCEPT
1—TRAP
2—REJECT
and the currently supported Reason Code Numbers are:
0—standard rules
1—manually set to always for this user/computer
2—association with other user/computer
3—number of other users sharing computer
4—number of computers this user is using While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A network security and fraud detection and prevention system, comprising:
one or more network service providers that provides a service;
a network device that connects to at least one of the network service providers over a communications network to use the provided service; and
at least one network service provider further comprising a fraud detector comprising a client
wherein the client gathers information about the network device to generate a device identifier that identifies the network device, a database, and a module that receives the device identifier, stores the device identifier in the database and associates the device identifier with end-user account information provided by the network service provider and wherein the device identifier and end-user account information is shared between the one or more network service providers to detect fraud using the network device across the network service providers.

2. The system of claim 1, wherein the database further comprises a plurality of records wherein each record further comprises a host field containing an identifier of a particular network service provider, a user account information field containing information from the particular network service provider that identifies a particular user and the device identifier that uniquely identifies the particular network device.

3. The system of claim 1, wherein the fraud detector further comprises a module that generates a network device identifier for each network device that connects to at least one network service provider wherein the network device identifier uniquely identifies each network device in combination with the device identifier.

4. The system of claim 3, wherein the device identifier further comprises a fingerprint.

5. The system of claim 1, wherein the fraud detector validates each network device on a periodic random basis.

6. The system of claim 1, wherein the fraud detector validates each network device upon connection of the network device to the network service provider.

7. The system of claim 1, wherein the fraud detector validates each network device when the network device logs onto the network service provider.

8. The system of claim 1, wherein the fraud detector validates each network device when the network device performs a transaction with the network service provider.

9. The system of claim 1, wherein the fraud detector validates each network device each time that the network device re-connects to the network service provider.

10. The system of claim 1, wherein the device identifier further comprises a fingerprint.

11. The system of claim 1, wherein the device identifier further comprises a serial number for a cellular phone.

12. The system of claim 1, wherein the client is embedded in a software application being downloaded to the network device from the network service provider.

13. The system of claim 1, wherein the client is a stand-alone software application that is downloaded to the network device from the network service provider.

14. The system of claim 1, wherein the client is a piece of code that is automatically downloaded to the network device from the network service provider.

15. The system of claim 1, wherein the client is downloaded to the network device when the network device connects to the network service provider.

16. The system of claim 1, wherein the network device further comprises one of a cellular phone, a personal digital assistant, a laptop computer, a personal computer and a telephone.

17. A method for detecting fraud during a connection of a network device to a network service provider using the fraud detection information from a plurality of associated network service providers, the method comprising:
validating a network device identifier assigned to the network device;
validating a combination of the network device identifier and a network device fingerprint for the network device;
verifying that the status of the network device identifier and the network device fingerprint for the network device are acceptable to the network service provider based on a set of status rules of the network service provider; and
verifying that the status of the network device identifier and the network device fingerprint for the network device are acceptable to the associated network service providers.

18. The method of claim 17 further comprising verifying that the number of user accounts per network device identifier are acceptable to the network service provider, and verifying that the number of network device identifiers per user account are acceptable to the network service provider.

19. A method for detecting fraud during a connection of an unknown network device to a network service provider, the method comprising:
launching an application on a network device that launches a fraud detection client;
determining, using the client, that the network device is an unregistered network device;
receiving a network device identifier requested from a fraud detection system; generating, using the client, a fingerprint based on characteristics of the network device that is forwarded to the fraud detection system; and
verifying, at the fraud detection system, that the fingerprint of the network device is not duplicative.

20. The method of claim 19 further comprising providing a login dialog to the network device.

21. The method of claim 19 further comprising verifying that a username and password provided by the user of the network device are valid, providing the network device identifier and an end user identifier to the fraud detection system from the network service provider and checking a status of the network device identifier and end user identifier based on a set of rules of the network service provider.

22. A method for detecting fraud during a connection of a known network device to a network service provider, the method comprising:
launching an application on a network device that launches a fraud detection client on the network device;
determining, using the client, that the network device is a registered network device having an assigned network device identifier;
generating, using the client, a fingerprint based on characteristics of the network device that is forwarded to the fraud detection system with the assigned network device identifier; and
verifying, at the fraud detection system, that the fingerprint of the network device is not duplicative and that the network device identifier is valid.

23. The method of claim 22 further comprising providing a login dialog to the network device.

24. The method of claim 22 further comprising verifying that a username and password provided by the user of the network device are valid, providing the network device identifier and an end user identifier to the fraud detection system from the network service provider and checking a status of the network device identifier and end user identifier based on a set of rules of the network service provider.

25. A network security and fraud detection and prevention system, comprising:
one or more network service providers that provides a service;
a network device that connects to at least one of the network service providers over a communications network to use the provided service; and
at least one network service provider further comprising fraud detector means further comprising a client means, downloaded to the network device when the network device connects to the network service provider, for gathering information about the network device to generate a device identifier that identifies the network device, a database and means for receiving the device identifier, storing the device identifier in the database and associating the device identifier with end-user account information provided by the network service provider and wherein the device identifier and end-user account information is shared between the one or more network service providers to detect fraud using the network device across the network service providers.

26. The system of claim 25, wherein the database further comprises a plurality of records wherein each record further comprises a host field containing an identifier of a particular network service provider, a user account information field containing information from the particular network service provider that identifies a particular user and the device identifier that uniquely identifies the particular network device.

27. The system of claim 25, wherein the fraud detecting means further comprises means for generating a network device identifier for each network device that connects to at least one network service provider wherein the network device identifier uniquely identifies each network device in combination with the device identifier.

28. The system of claim 27, wherein the device identifier further comprises a fingerprint.

29. The system of claim 25, wherein the fraud detection means further comprises means for validating each network device on a periodic random basis.

30. The system of claim 25, wherein the fraud detector means further comprises means for validating each network device upon connection of the network device to the network service provider.

31. The system of claim 25, wherein the fraud detection means further comprises means for validating each network device when the network device logs onto the network service provider.

32. The system of claim 25, wherein the fraud detection means further comprises means for validating each network device when the network device performs a transaction with the network service provider.

33. The system of claim 25, wherein the fraud detection means further comprises means for validating each network device each time that the network device re-connects to the network service provider.

34. The system of claim 25, wherein the device identifier further comprises a fingerprint.

35. The system of claim 25, wherein the device identifier further comprises a serial number for a cellular phone.

36. The system of claim 25, wherein the client means is embedded in a software application being downloaded to the network device from the network service provider.

37. The system of claim 25, wherein the client means is a stand-alone software application that is downloaded to the network device from the network service provider.

38. The system of claim 25, wherein the client means is a piece of code that is automatically downloaded to the network device from the network service provider.

39. The system of claim 25, wherein the client means is downloaded to the network device when the network device connects to the network service provider.

40. The system of claim 25, wherein the network device further comprises one of a cellular phone, a personal digital assistant, a laptop computer, a personal computer and a telephone.

41. A network security and fraud detection and prevention system, comprising:
one or more network service providers that provides a service;
a network device that connects to at least one of the network service providers over a communications network to use the provided service; and
at least one network service provider further comprising a fraud detector further comprising a client piece of code that is downloaded to the network device when the network device connects to the network service provider wherein the client gathers information about the network device to generate a device identifier that identifies the network device, a database and computer instructions that receive the device identifier and store the device identifier in the database and associate the device identifier with end-user account information provided by the network service provider and wherein the device identifier and end-user account information is shared between the one or more network service providers to detect fraud using the network device across the network service providers.

42. The system of claim 41, wherein the database further comprises a plurality of records wherein each record further comprises a host field containing an identifier of a particular network service provider, a user account information field containing information from the particular network service provider that identifies a particular user and the device identifier that uniquely identifies the particular network device.

43. The system of claim 41, wherein the fraud detector further comprises instructions that generate a network device identifier for each network device that connects to at least one network service provider wherein the network device identifier uniquely identifies each network device in combination with the device identifier.

44. The system of claim 43, wherein the device identifier further comprises a fingerprint.

45. The system of claim 41, wherein the fraud detector further comprises instructions that validate each network device on a periodic random basis.

46. The system of claim 41, wherein the fraud detector further comprises instructions that validate each network device upon connection of the network device to the network service provider.

47. The system of claim 41, wherein the fraud detector further comprises instructions that validate each network device when the network device logs onto the network service provider.

48. The system of claim 41, wherein the fraud detector further comprises instructions that validate each network device when the network device performs a transaction with the network service provider.

49. The system of claim 41, wherein the fraud detector further comprises instructions that validate each network device each time that the network device re-connects to the network service provider.

50. The system of claim 41, wherein the device identifier further comprises a fingerprint.

51. The system of claim 41, wherein the device identifier further comprises a serial number for a cellular phone.

52. The system of claim 41, wherein the client is embedded in a software application being downloaded to the network device from the network service provider.

53. The system of claim 41, wherein the client is a stand-alone software application that is downloaded to the network device from the network service provider.

54. The system of claim 41, wherein the client is a piece of code that is automatically downloaded to the network device from the network service provider.

55. The system of claim 41, wherein the client is downloaded to the network device when the network device connects to the network service provider.

56. The system of claim 41, wherein the network device further comprises one of a cellular phone, a personal digital assistant, a laptop computer, a personal computer and a telephone.

* * * * *

US007272728C1

(12) EX PARTE REEXAMINATION CERTIFICATE (9151st)
United States Patent
Pierson et al.

(10) Number: US 7,272,728 C1
(45) Certificate Issued: Jul. 24, 2012

(54) NETWORK SECURITY AND FRAUD DETECTION SYSTEM AND METHOD

(75) Inventors: Greg Pierson, Gresham, OR (US); Jason DeHaan, Chicago, IL (US)

(73) Assignee: Iovation, Inc., Portland, OR (US)

Reexamination Request:
No. 90/011,499, Feb. 18, 2011

Reexamination Certificate for:
Patent No.: 7,272,728
Issued: Sep. 18, 2007
Appl. No.: 10/867,871
Filed: Jun. 14, 2004

(51) Int. Cl.
*G06F 11/30* (2006.01)

(52) U.S. Cl. .................. 713/194; 713/166; 713/167; 713/168

(58) Field of Classification Search .................. 713/194
See application file for complete search history.

(56) References Cited

To view the complete listing of prior art documents cited during the proceeding for Reexamination Control Number 90/011,499, please refer to the USPTO's public Patent Application Information Retrieval (PAIR) system under the Display References tab.

*Primary Examiner* — Mark Sager

(57) ABSTRACT

A system and method to detect and prevent fraud in a system is provided. The system may uniquely identify physical devices connecting to a network, register unique devices, track end-user logins, associate end-user accounts with specific devices, and share information with multiple network service providers is described.

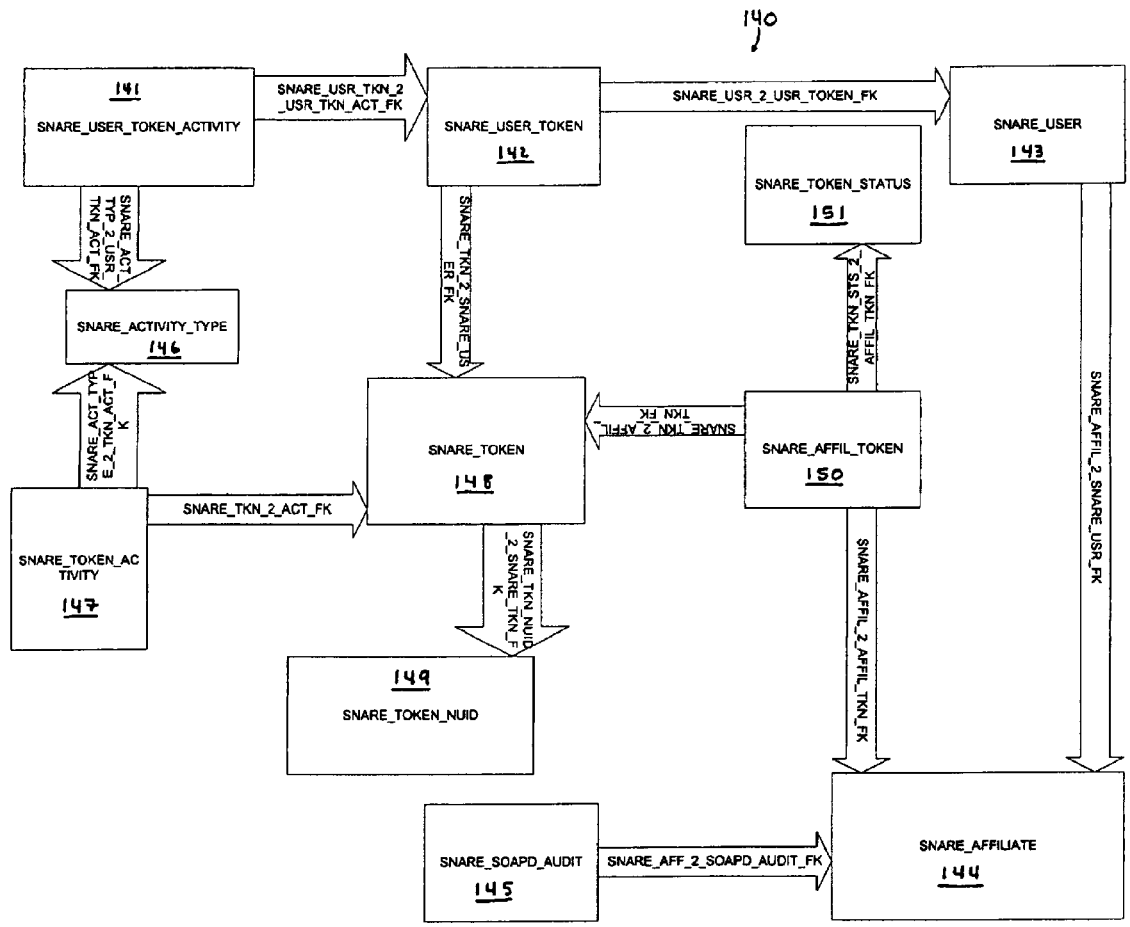

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19-24 is confirmed.

Claim 17 is cancelled.

Claims 1, 18, 25 and 41 are determined to be patentable as amended.

Claims 2-16, 26-40 and 42-56, dependent on an amended claim, are determined to be patentable.

New claims 57-94 are added and determined to be patentable.

1. A network security and fraud detection and prevention system, comprising:
[one or more] *multiple* network service providers that *each* provides a service;
a network device that connects to at least one of the *multiple* network service providers over a communications network to use the provided service; and
*the* at least one network service provider further comprising a fraud detector comprising a client wherein the client gathers information about the network device to generate a device identifier that identifies the network device, *based on characteristics of the network device,*
a database, and
a module that receives the device identifier, stores the device identifier in the database and associates the device identifier with end-user account information provided by the network service provider and wherein the device identifier and end-user account information is shared between the [one or more] *multiple* network service providers to detect fraud using the network device across the *multiple* network service providers.

18. The method of claim [17] *70*, further comprising verifying that the number of user accounts per network device identifier are acceptable to the network service provider, and verifying that the number of network device identifiers per user account are acceptable to the network service provider.

25. A network security and fraud detection and prevention system, comprising:
[one or more] *multiple* network service providers that *each* provides a service;
a network device that connects to at least one of the *multiple* network service providers over a communications network to use the provided service; and
*the* at least one network service provider further comprising fraud detector means further comprising a client means, downloaded to the network device when the network device connects to the *at least one* network service provider, for gathering information about the network device to generate a device identifier that identifies the network device, *based on characteristics of the network device,*
a database and
means for receiving the device identifier, storing the device identifier in the database and associating the device identifier with end-user account information provided by the network service provider and wherein the device identifier and end-user account information is shared between the [one or more] *multiple* network service providers to detect fraud using the network device across the *multiple* network service providers.

41. A network security and fraud detection and prevention system, comprising:
[one or more] *multiple* network service providers that *each* provides a service;
a network device that connects to at least one of the *multiple* network service providers over a communications network to use the provided service; and
*the at least one network service provider further comprising a fraud detector further comprising a client piece of code that is downloaded to the network device when the network device connects to the at least one* the network service provider wherein the client gathers information about the network device to generate a device identifier that identifies the network device, *based on characteristics of the network device,*
a database and computer instructions that receive the device identifier and store the device identifier in the database and associate the device identifier with end-user account information provided by the *at least one* network service provider and wherein the device identifier and end-user account information is shared between the [one or more] *multiple* network service providers to detect fraud using the network device across the *multiple* network service providers.

*57. The system of claim 1, wherein the database stores fraud activity information associated with said device identifier, and said stored fraud activity information associated with said device identifier is shared with the multiple network service providers.*

*58. The system of claim 1, wherein the module associates said device identifier with one or more end-user accounts, and information regarding said device identifier and the associated one or more end-user accounts is shared with the multiple network service providers.*

*59. The system of claim 1, wherein the module associates an end-user account with one or more specific devices, and information regarding said specific devices and the associated end-user account is shared with the multiple network service providers.*

*60. The system of claim 1, wherein the database stores a plurality of statuses of said device identifier for the at least one network service provider, where the plurality of statuses are determined according to different sets of criteria.*

*61. The system of claim 60, wherein each of the plurality of statuses is arrived at by applying said different sets of criteria to one or more activities of the network device, and said plurality of statuses are shared between multiple network service providers to detect fraud using the network device across the multiple network service providers.*

*62. The system of claim 1, wherein each of said plurality of network service providers sets one or more statuses for use in determining a response to requests for access to such network service provider based on status, wherein the status* or statuses set by at least some of the network service providers are different.

63. The system of claim 1, wherein each of said multiple network service providers applies a set of rules for determining whether to deny access by the network device, wherein the rules applied by the multiple network service providers are different.

64. The system of claim 1, wherein when a problem is identified with an end-user account, devices associated with such account and other end-user accounts associated with such devices will be denied access to the multiple network service providers.

65. The system of claim 1, wherein the module in response to information regarding customer interaction provides to said at least one network service provider an action response indicating a suggested course of action.

66. The system of claim 1, wherein said at least one network service provider automatically requests information, and the requested information is automatically and periodically generated from the database based on the requests.

67. The system of claim 1, wherein it is determined as to whether a status of the device identifier is acceptable to at least some of the multiple network service providers.

68. A method for detecting fraud during a connection of a network device to a network service provider using the fraud detection information from a plurality of associated network service providers, the method comprising:
  validating a network device identifier assigned to the network device;
  validating a combination of the network device identifier and a network device fingerprint for the network device;
  verifying that the status of the network device identifier and the network device fingerprint for the network device are acceptable to the network service provider based on a set of status rules of the network service provider; and
  verifying that the status of the network device identifier and the network device fingerprint for the network device are acceptable to the associated network service providers, wherein the combination of the network device identifier and the network device fingerprint for the network device is validated by matching the network device identifier and the network device fingerprint of the network device with a network device identifier and a network device fingerprint for the network device stored in a database, wherein the network device fingerprint is generated based on characteristics of the network device.

69. A method for detecting fraud during a connection of a network device to a network service provider using the fraud detection information from a plurality of associated network service providers, the method comprising:
  validating a network device identifier assigned to the network device;
  validating a combination of the network device identifier and a network device fingerprint for the network device;
  verifying that the status of the network device identifier and the network device fingerprint for the network device are acceptable to the network service provider based on a set of status rules of the network service provider; and
  verifying that the status of the network device identifier and the network device fingerprint for the network device are acceptable to the associated network service providers, wherein each of said multiple network service providers sets one or more statuses for use in determining a response to requests for access to such network service provider based on status, wherein the status or statuses set by at least some of the network service providers are different.

70. A method for detecting fraud during a connection of a network device to a network service provider using the fraud detection information from a plurality of associated network service providers, the method comprising:
  validating a network device identifier assigned to the network device;
  validating a combination of the network device identifier and a network device fingerprint for the network device;
  verifying that the status of the network device identifier and the network device fingerprint for the network device are acceptable to the network service provider based on a set of status rules of the network service provider; and
  verifying that the status of the network device identifier and the network device fingerprint for the network device are acceptable to the associated network service providers, wherein each of said multiple network service providers applies a set of rules for determining whether to deny access by the network device, wherein the rules applied by the multiple network service providers are different.

71. A method for detecting fraud during a connection of a network device to a network service provider using the fraud detection information from a plurality of associated network service providers, the method comprising:
  validating a network device identifier assigned to the network device;
  validating a combination of the network device identifier and a network device fingerprint for the network device;
  verifying that the status of the network device identifier and the network device fingerprint for the network device are acceptable to the network service provider based on a set of status rules of the network service provider; and
  verifying that the status of the network device identifier and the network device fingerprint for the network device are acceptable to the associated network service providers, wherein a fraudulent transaction using the network device to access a non-trusted network service provider is ignored in verifying that the status of the network device identifier and the network device fingerprint for the network device are acceptable to the associated network service providers.

72. The method of claim 19, further comprising the network service provider denying access by the unknown network device when the fingerprint of the network device is duplicative.

73. The system of claim 25, wherein the database stores fraud activity information associated with said device identifier, and said stored fraud activity information associated with said device identifier is shared with the multiple network service providers.

74. The system of claim 25, wherein the receiving means associates said device identifier with one or more end-user accounts, and information regarding said device identifier and the associated one or more end-user accounts is shared with the multiple network service providers.

75. The system of claim 25, wherein the receiving means associates an end-user account with one or more specific devices, and information regarding said specific devices and the associated end-user account is shared with the multiple network service providers.

76. The system of claim 25, wherein the database stores a plurality of statuses of said device identifier for the at least one network service provider, where the plurality of statuses are determined according to different sets of criteria.

77. The system of claim 76, wherein each of the plurality of statuses is arrived at by applying said different sets of criteria to one or more activities of the network device, and said plurality of statuses are shared between multiple network service providers to detect fraud using the network device across the multiple network service providers.

78. The system of claim 25, wherein each of said plurality of network service providers sets one or more statuses for use in determining a response to requests for access to such network service provider based on status, wherein the status or statuses set by at least some of the network service providers are different.

79. The system of claim 25, wherein each of said multiple network service providers applies a set of rules for determining whether to deny access by the network device, wherein the rules applied by the multiple network service providers are different.

80. The system of claim 25, wherein when a problem is identified with an end-user account, devices associated with such account and other end-user accounts associated with such devices will be denied access to the multiple network service providers.

81. The system of claim 25, wherein the receiving means in response to information regarding customer interaction provides to said at least one network service provider an action response indicating a suggested course of action.

82. The system of claim 25, wherein said at least one network service provider automatically requests information, and the requested information is automatically and periodically generated from the database based on the requests.

83. The system of claim 25, wherein it is determined as to whether a status of the device identifier is acceptable to at least some of the multiple network service providers.

84. The system of claim 41, wherein the database stores fraud activity information associated with said device identifier, and said stored fraud activity information associated with said device identifier is shared with the multiple network service providers.

85. The system of claim 41, wherein the database and computer instructions associate said device identifier with one or more end-user accounts, and information regarding said device identifier and the associated one or more end-user accounts is shared with the multiple network service providers.

86. The system of claim 41, wherein the database and computer instructions associate an end-user account with one or more specific devices, and information regarding said specific devices and the associated end-user account is shared with the multiple network service providers.

87. The system of claim 41, wherein the database stores a plurality of statuses of said device identifier for the at least one network service provider, where the plurality of statuses are determined according to different sets of criteria.

88. The system of claim 87, wherein each of the plurality of statuses is arrived at by applying said different sets of criteria to one or more activities of the network device, and said plurality of statuses are shared between multiple network service providers to detect fraud using the network device across the multiple network service providers.

89. The system of claim 41, wherein each of said plurality of network service providers sets one or more statuses for use in determining a response to requests for access to such network service provider based on status, wherein the status or statuses set by at least some of the network service providers are different.

90. The system of claim 41, wherein each of said multiple network service providers applies a set of rules for determining whether to deny access by the network device, wherein the rules applied by the multiple network service providers are different.

91. The system of claim 41, wherein when a problem is identified with an end-user account, devices associated with such account and other end-user accounts associated with such devices will be denied access to the multiple network service providers.

92. The system of claim 41, wherein the database and computer instructions module in response to information regarding customer interaction provide to said at least one network service provider an action response indicating a suggested course of action.

93. The system of claim 41, wherein said at least one network service provider automatically requests information, and the requested information is automatically and periodically generated from the database based on the requests.

94. The system of claim 41, wherein it is determined as to whether a status of the device identifier is acceptable to at least some of the multiple network service providers.

* * * * *